(12) United States Patent
Tu

(10) Patent No.: US 7,155,339 B2
(45) Date of Patent: Dec. 26, 2006

(54) DISPLAY METHOD AND APPARATUS FOR NAVIGATION SYSTEM FOR SEARCHING POI AND ARRANGING LISTING ORDER OF POI

(75) Inventor: Ihung S. Tu, Anaheim, CA (US)

(73) Assignee: Alpine Electronics, Inc., Tokyo (JP)

( * ) Notice: Subject to any disclaimer, the term of this patent is extended or adjusted under 35 U.S.C. 154(b) by 87 days.

(21) Appl. No.: 10/772,498

(22) Filed: Feb. 5, 2004

(65) Prior Publication Data

US 2004/0260465 A1    Dec. 23, 2004

Related U.S. Application Data

(63) Continuation-in-part of application No. 10/460,960, filed on Jun. 13, 2003, now Pat. No. 6,839,628.

(51) Int. Cl.
  *G01C 21/32* (2006.01)
  *G08G 1/123* (2006.01)
  *G08G 1/13* (2006.01)
  *G01C 21/34* (2006.01)
  *G01C 21/00* (2006.01)

(52) U.S. Cl. ............ 701/209; 701/208; 701/210; 340/995.1; 340/995.24; 340/995.27

(58) Field of Classification Search ........... 340/995.14, 340/995.27, 995.24, 995.239, 995.1; 701/203, 701/208, 209, 210
See application file for complete search history.

(56) References Cited

U.S. PATENT DOCUMENTS

| | | | |
|---|---|---|---|
| 5,612,881 A * | 3/1997 | Moroto et al. ............ 701/209 |
| 6,108,631 A | 8/2000 | Ruhl | |
| 6,128,571 A * | 10/2000 | Ito et al. ............ 701/201 |
| 6,282,493 B1 * | 8/2001 | Kitagawa et al. ........ 701/211 |
| 6,434,482 B1 | 8/2002 | Oshida et al. | |
| 6,446,004 B1 * | 9/2002 | Cao et al. ............ 701/213 |
| 6,484,094 B1 | 11/2002 | Wako | |
| 6,529,143 B1 * | 3/2003 | Mikkola et al. ........ 340/995.1 |
| 6,542,814 B1 * | 4/2003 | Polidi et al. ............ 701/208 |
| 6,665,610 B1 * | 12/2003 | Correia et al. ........... 701/209 |
| 6,865,479 B1 * | 3/2005 | Chen et al. ............ 701/209 |
| 6,933,860 B1 * | 8/2005 | Gehman ............ 340/995.1 |
| 2001/0007968 A1 * | 7/2001 | Shimazu ............ 701/211 |
| 2002/0128768 A1 * | 9/2002 | Nakano et al. ........... 701/202 |
| 2003/0036848 A1 * | 2/2003 | Sheha et al. ............ 701/209 |
| 2003/0191578 A1 * | 10/2003 | Paulauskas et al. ....... 701/200 |
| 2004/0107044 A1 * | 6/2004 | Hasegawa et al. ........ 701/200 |

* cited by examiner

*Primary Examiner*—Thomas Black
*Assistant Examiner*—Christine M. Behncke
(74) *Attorney, Agent, or Firm*—Muramatsu & Associates

(57) ABSTRACT

A display method and apparatus for navigation system enables a user easily see a list of points of interest (POIs) along a route to a destination. The navigation system shows a list of distance ranges of the route where each range shows a number of POIs searched. The current user position is marked in the corresponding distance range. The navigation system displays a list of POI names in the selected distance range where the POI names are arranged in the order that the user sees the POIs along the route. For determining the listing order, the navigation system uses a plurality of region circles having their centers on the route to the destination, and retrieves POIs contained in the region circles and calculates a modified distance of each POI.

28 Claims, 17 Drawing Sheets

Fig. 1A  Prior Art

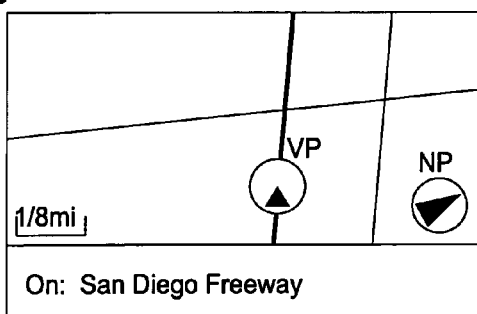

On: San Diego Freeway

Fig. 1B

| Dest | Find Destination by |
|---|---|
| | Address |
| | Intersection |
| | Point of Interest |
| | Map Cursor |
| | Recent Route |
| | Address Book |
| | Today's Plan |

Fig. 1C

| Dest | Find Point of Interest by |
|---|---|
| | Place Name |
| | Place Type |

Fig. 1D

| Dest | Select Category |
|---|---|
| | ATM |
| | BANK |
| | GAS STATION |
| | HOSPITAL |
| | MOVIE THEATER |
| | RESTAURANT |
| | VETERINARIAN |

Fig. 1E

| Dest | Select Name |
|---|---|
| | Genkai<br>15435 Jeffrey Rd. Irvine, CA<br>(949) 786-3420 |
| | Pizza Hut |
| | Genaki |
| | Hard Rock Cafe |
| | Sushi Boy |

Fig. 1F

| Confirm Route |
|---|
| Genkai<br>15435 Jeffrey Rd. Irvine, CA<br>(949) 786-3420 |
| By Quickest Route Method |
| OK to Proceed |
| Options |

Fig. 1G

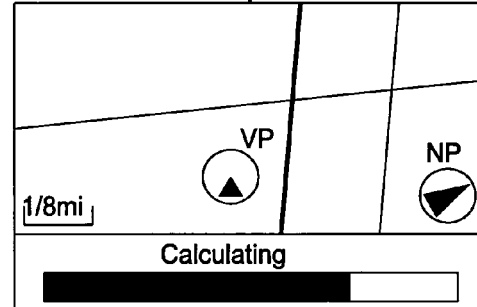

Calculating

Fig. 1H

Next Turn: ← 1.8 mi
Jeffery Rd.

To  6 mi  0:11 to go
On: Alton St., Irvine

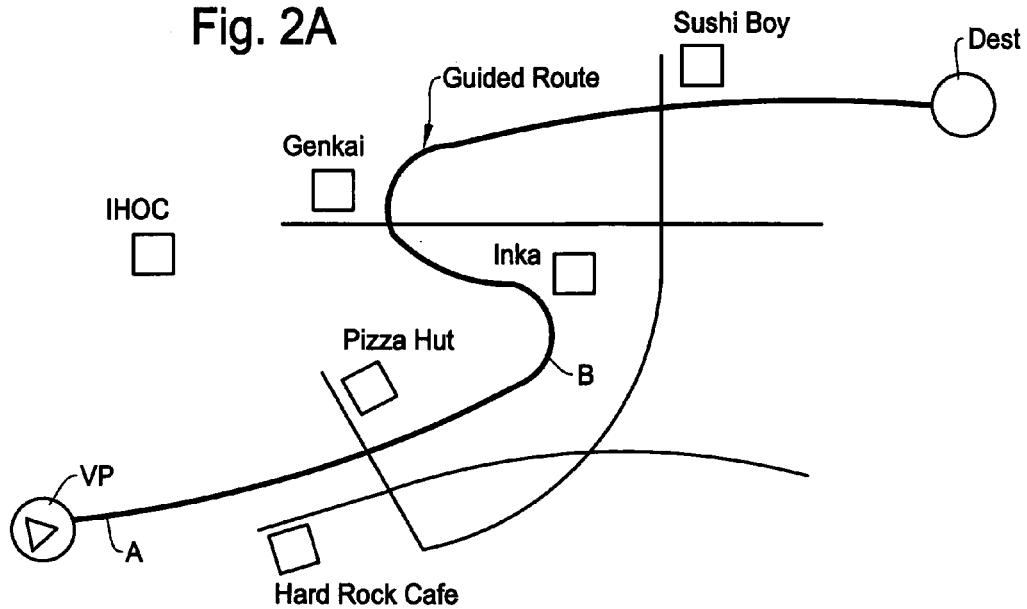

DISPLAY METHOD AND APPARATUS FOR NAVIGATION SYSTEM FOR SEARCHING POI AND ARRANGING LISTING ORDER OF POI

This is a continuation-in-part of U.S. application Ser. No. 10/460,960 filed Jun. 13, 2003 now U.S. Pat. No. 6,839,628.

FIELD OF THE INVENTION

This invention relates to a display method and apparatus for navigation system for route guidance to the destination, and more particularly, to a method and apparatus which is capable of searching points of interest along the route to the destination and listing names of the points of interest on a screen in such an order that a user actually sees the POIs along a calculated route to the destination.

BACKGROUND OF THE INVENTION

A navigation system performs travel guidance for enabling a user to easily and quickly reach the selected destination. A typical example is a vehicle navigation system where a user drives a car having a vehicle navigation system. Such a navigation system detects the position of the user or user's vehicle, reads out map data pertaining to an area at the current vehicle position from a data storage medium. Alternatively, such map data can be provided to the user from a remote server through a communication network such as Internet.

When a destination is set, the navigation system starts a route guidance function for setting a guided route from the start point to the destination. During the route guidance, the navigation system reads the nodes data from the data storage medium such as DVD and successively stores the nodes data of road segments constituting the guided route in a memory. In the actual traveling, the node series stored in the memory is searched for a portion of the guided route to be displayed in a map display area of the monitor screen, and the portion of the guided route is highlighted so as to be discriminable from other routes. When the vehicle is within a predetermined distance of an intersection it is approaching, a highlighted intersection diagram with an arrow indicating the direction to turn at the intersection is displayed to inform the user of the appropriate road or direction at the intersection.

FIGS. 1A–1H show an example of overall procedure and screen display involved in the navigation system. FIG. 1A shows an example of locator map screen of the navigation system when the destination is not specified. Typically, the navigation system displays a street on which the vehicle (current vehicle position VP) is running on a map image and a name of the street. Other information such as a north pointer NP, a map scale and a current time may also be illustrated on the display screen.

FIGS. 1B–1F show an example of process for specifying a destination in the navigation system. When selecting a "Destination" menu on a main menu screen (not shown), the navigation system displays an "Find Destination By" screen as shown in FIG. 1B for specifying an input method for selecting the destination. The "Find Destination By" screen lists various methods for selecting the destination. The methods include "Address" for specifying the city and address of the destination, "Intersection" for specifying the names of two streets which intersect with one another, and "Point of Interest" (POI) for selecting the programmed destination based on the name, category or telephone number. Other methods in the "Find Destination By" screen include "Recent Route" for specifying the destination based on the recent history of destinations saved in the navigation system, "Address Book" for selecting the address of the destination out of the prescribed address list stored in the system, and "Today's Plan" for selecting two or more destinations.

When selecting, for example, the "Point of Interest" method in FIG. 1B, the navigation system displays selection methods of point of interest (POI) either by "Place Name" or "Place Type" in FIG. 1C. The "Place Name" is to specify a name of POI, and the "Place Type" is to specify a category of POI. If the "Place Type" is selected in FIG. 1C, the navigation system shows an "Select Category" screen such as shown in FIG. 1D.

Suppose the user selects "Restaurant", the navigation system retrieves the POIs in the selected category, restaurant, in this case, as shown in FIG. 1E. Typically, names of POIs (restaurants) will be listed in the order of distance from the user (ex. current vehicle position). If the user selects a particular restaurant from the list, the navigation system displays a "Confirm Route" screen such as shown in FIG. 1F. In this example, the "Confirm Route" screen lists the name, address and phone number of the destination (POI specified by the user). If this is the correct destination, the user enters an "OK to Proceed" key to proceed to the next procedure.

In FIG. 1G, the navigation system calculates and determines a route to the destination, i.e., the selected POI. The navigation system determines a route to the destination based on, for example, the shortest way to reach the destination, the route using many free ways as possible or the route without using toll road, and the like. In this example, the navigation system displays a progress scale of the calculation of the route.

After determining the guided route, the navigation system starts the route guidance as shown in FIG. 1H to guide the user along the calculated route to the destination. Typically, the navigation system shows the intersection which is highlighted to show the next turn and a direction of the turn. Such route guidance by the navigation system is also accompanied by voice instructions.

The foregoing is a typical example of using the "Point of Interest (POI)" input method of the navigation system. Because the recent storage medium provides a large volume of POI data, this input method can be used in various applications. For example, suppose a user is driving a car for a relatively long trip and the final destination is already specified in the vehicle navigation system, i.e., a calculated route to the destination is established. During the trip to the destination, the user wants to stop by various places such as a gas station, restaurant, shopping mall, etc., along the calculated route. Alternatively, the user may simply want to enjoy seeing various places surrounding the calculated route to the destination with use of the list of POI names on the monitor screen.

Thus, there is a need of a function in a navigation system for searching POIs along the calculated route to the destination during the trip. It is preferable to sort the searched POIs by distance ranges on the display. There is also a need of a display method for listing the POIs along the calculated route in the order that the user actually see them when he is moving. Such a situation is shown in FIGS. 2A–2E where a user is travelling to the destination (Dest) while the navigation system is listing POIs of selected category such as "Restaurant". FIG. 2A shows an example of calculated (guided) route to the destination where the user (vehicle position VP) is at a position A. Typically, the user selects to list the POIs in the order of distance from the user's current position as shown in FIG. 2B. FIG. 2C shows an example of listing the POIs (restaurants) in the order of distance.

When sorting POIs by distance, generally, the distance for each POI is measured along the drive length on the road rather than the straight-line length. Thus, in the example of FIG. 2A, the POI names will be listed in the order of "Pizza Hut", "Hard Rock Cafe", "Inka", "Genkai" and "Sushi Boy" as shown in FIG. 2C. The order of POIs in the list of FIG. 2C may not be the order that the user actually sees while driving the calculated route.

For example, at the position A, "Hard Rock Cafe" looks closer to the user than "Pizza Hut". This is because the straight-line distance of "Hard Rock Cafe" is smaller than that of "Pizza Hut". However, the actual drive length to "Hard Rock Cafe" is longer than that of "Pizza Hut" because of the particular road situation. Thus, the POI list of FIG. 2C correctly lists "Pizza Hut" prior to "Hard Rock Cafe". In this situation, however, it is preferable that "Hard Rock Cafe" is listed prior to "Pizza Hut" because there is not a significant difference in the total drive length to either POI, and the user sees "Hard Rock Cafe" closer than "Pizza Hut".

Further, at the position A, the user sees and feels that "Genkai" is closer to the user than "Inka" although the actual length along the road to "Genkai" is much longer than that of "Inka". Thus, at the position A, if the selected category of POIs (ex., restaurants) are sorted by distance (FIG. 2D), the order shown in FIG. 2E may match what the user actually sees rather than the order of FIG. 2C. However, because there is a significant difference in the actual drive length between "Inka" and "Genkai" it may not be appropriate to list the order of these POIs in a manner too inconsistent to the actual drive length. Further, at the position of B, the order of actual distance (road length) and the order of actual view (straight-line length) between "Inka" and "Genkai" are the same.

In other words, the order of POIs that the user can actually see varies dynamically depending the position and the surrounding conditions of the calculated route. Further, in such a situation of FIG. 2A, a POI which is substantially deviated from the route such as "IHOC" should be excluded from the POI list. Thus, there is a need of a display method for a navigation system that can search POIs along the route to the destination within a predetermined transversal range and list the POIs in an order that a user actually see while taking consideration of balance with actual drive lengths to the POIs.

SUMMARY OF THE INVENTION

It is, therefore, an object of the present invention to provide a display method and apparatus for a navigation system which is capable of searching the names of points of interest (POIs) along the route to the destination based on predetermined distance ranges.

It is another object of the present invention to provide a display method and apparatus for a navigation system which is capable of listing the numbers of points of interest (POIs) along the route to the destination on a list of predetermined distance ranges and illustrating a current position of the user on the list of distance ranges.

It is another object of the present invention to provide a display method and apparatus for a navigation system which is capable of listing the names of points of interest (POIs) in such an order that the user sees the POIs when traveling along the route to the destination.

The navigation system of the present invention is designed to search POIs along the calculated route to the destination with respect to distance ranges on the calculated route and to allow the user to select the distance range to see details of the POIs therein while displaying the current user position in the distance. The navigation system is further designed to search POIs within a specified search area and to calculate a modified distance of each POI and to list the POIs in the order of modified distance in such a sequence that the user actually sees the POIs as he travels along the guided route to the destination.

More specifically, the method of the present invention includes the steps of: determining a route to the destination, specifying a search area along the route to the destination by dividing the route from a user position to the destination into distance ranges and by defining a transversal distance from the route, retrieving points of interest (POIs) within the search area, displaying a list of distance ranges where each distance range shows a number of POIs retrieved within the distance range, and displaying a list of POI names in a distance range selected by a user in an order determined by modified distance of the POIs calculated by a predetermined algorithm. A mark showing a current position of a user is illustrated in a corresponding distance range.

In the display method of the present invention, the process of defining the search area includes a process of defining a radius of a region circle and creating a plurality of region circles consecutively on the route, and the process of listing the POI names includes a process of calculating the modified distance of each POI based on distances from two (first and second) reference points on the route in two consecutive region circles to the POI and distances from the user position to the two reference points.

In the method of the present invention, the modified distance of each POI is calculated by:

$$D1 = [(Q_{k-1} + d_{11}) + (Q_k + d_{12})]/2$$

where $D1$ is a modified distance of a particular POI, $d_{11}$ is a straight-line distance between the first reference point and the POI, $d_{12}$ is a straight-line distance between the second reference point and the POI, $Q_{k-1}$ is a traveling distance along the route between the user position and the first reference point, and $Q_k$ is a traveling distance along the route distance between the user position and the second reference point.

Preferably, the first reference point is a center of one of the two consecutive region circles and the second reference point is a center of another region circle. In the case where the modified distances of two or more POIs in the consecutive two region circles are identical to one another, a POI whose distance $d_{11}$ from the first reference point is shorter than that of the other POIs is given the priority for determining the listing order.

Another aspect of the present invention is a display apparatus for a navigation system. The display apparatus is constituted by various means for achieving the display methods described above which searches POIs within the specified search area and calculates the modified distance of each POI and lists the POIs in the order of modified distance in such an order that the user actually sees the POIs as he travels along the guided route to the destination.

According to the present invention, the navigation system searches POIs along the calculated route to the destination with respect to distance ranges on the calculated route and allows the user to select the distance range to see details of the POIs therein while displaying the current user position in the distance range. The navigation system searches the POIs along the route to the destination and calculates a modified distance of each POI to list the POIs in the order that the user actually sees the POIs as he travels along the guided route to the destination.

For determining the listing order, the method and apparatus of the present invention uses a plurality of region circles having their centers on the route to the destination, retrieves POIs contained in the region circles and quickly calculates a modified distance of each POI by using adjacent centers of the region circles, compares the calculated distances and displays the POIs on the name list in the order of the modified distance. Consequently, the user will view the POI names on the name list in such a sequence that he actually sees the POI along the route to the destination. Therefore, the user can easily find out preferred POIs in the order listed in the POI list on the monitor screen. Moreover, the navigation system in the present invention can provide the user good estimation and preparation to stop by the favorite POIs along the route.

BRIEF DESCRIPTION OF THE DRAWINGS

FIGS. 1A–1H are schematic diagrams showing an example operational process and display example of navigation system for implementing the method and apparatus of the present invention.

FIG. 2A is a schematic diagram showing an example of guided route to the destination with POIs along the route and FIGS. 2B–2C are schematic diagrams of display examples showing the POIs sorted by distance based on drive lengths to the POIs, and FIGS. 2D–2E are schematic diagrams of display examples showing the POIs sorted by distance based on actual view by the user.

DETAILED DESCRIPTION OF THE INVENTION

The present invention will be described in detail with reference to the accompanying drawings. The navigation system of the present invention is designed to detect and display points of interest (POI) along the route to the destination that are sorted into distance ranges. As the user moves in following the calculated (guided) route to the destination, a mark indicating a vehicle (user) position will change accordingly to inform the user about the current user position with respect to the distance range. Further, the navigation system of the present invention is designed to enable a user to easily view the names of points of interest (POI) on a POI list wherein the POI names are arranged in such a sequence that the user actually sees the POIs as he travels along the guided route to the destination.

Figure 3:
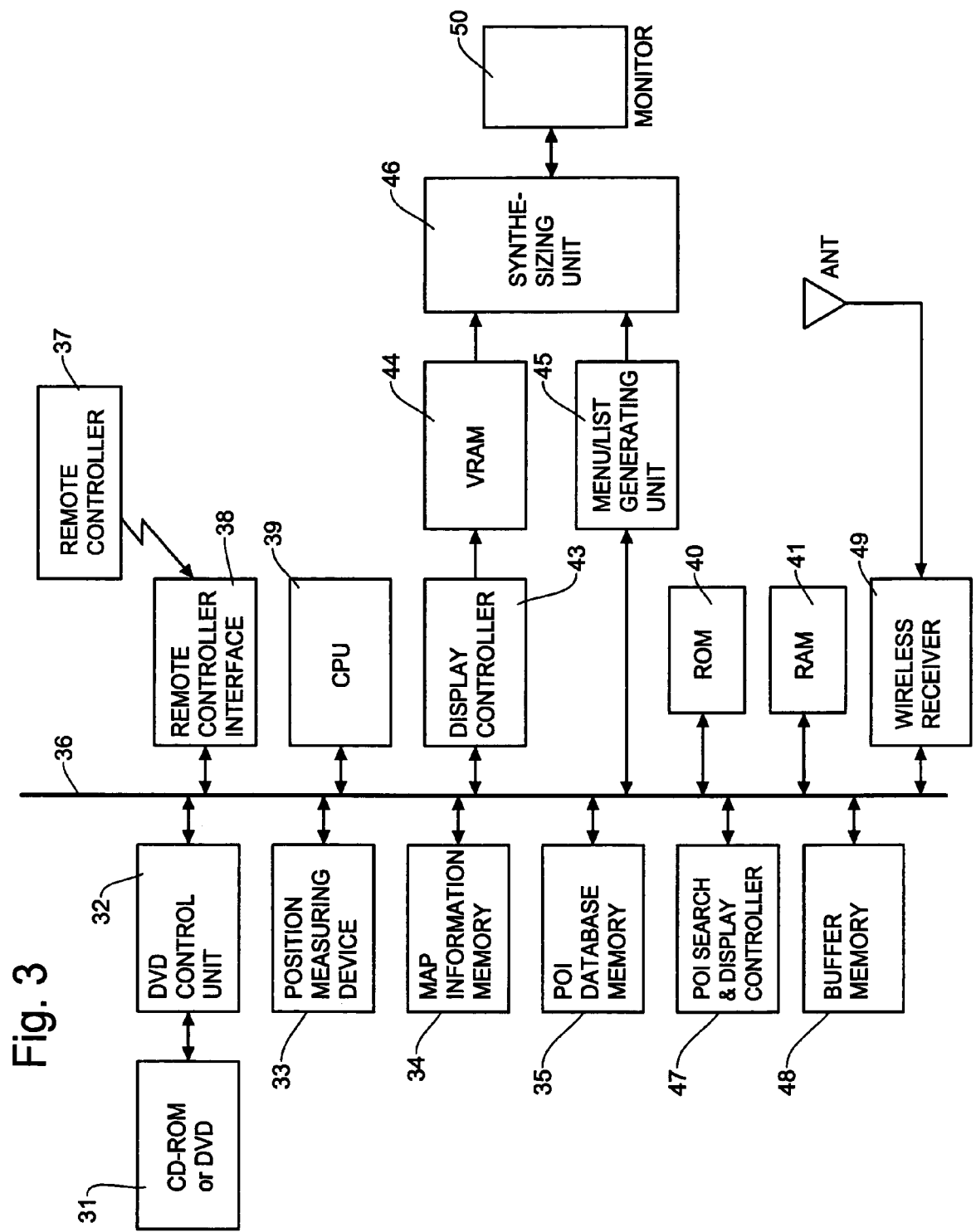
FIG. 3 is a block diagram showing an example of structure of the navigation system implementing the present invention for searching POIs for each distance range along the route to the destination and displaying the POIs in the order that the user actually sees the POIs.

The display method and apparatus of the present invention is advantageously applicable to a vehicle navigation system. FIG. 3 shows an example of structure of a vehicle navigation system implementing the present invention. It should be noted that the present invention can also be applied to a portable navigation device such as a one implemented by a PDA (personal digital assistant) device, a lap-top computer, or other hand-held devices.

In the block diagram of FIG. 3, the navigation system includes a map storage medium 31 such as a CD-ROM, DVD, hard disc or other storage means (hereafter "DVD") for storing map information, a DVD control unit 32 for a controlling an operation for reading the map information from the DVD, a position measuring device 33 for measuring the present vehicle position. The position measuring device 33 has a vehicle speed sensor for detecting a moving distance, a gyroscope for detecting a moving direction, a microprocessor for calculating a position, a GPS receiver, and etc.

The block diagram of FIG. 3 further includes a map information (data) memory 34 for storing the map information which is read out from the DVD 31, a database memory 35 for storing database information such as point of interest (POI) information which is read out from the DVD 31, a remote controller 37 for executing a menu selection operation, an enlarge/reduce operation, a destination input operation, etc. and a remote controller interface 38.

The navigation system further includes a bus 36 for interfacing the above units in the system, a processor (CPU)

39 for controlling an overall operation of the navigation system, a ROM 40 for storing various control programs such as a route search program and a map matching program necessary for navigation control, a RAM 41 for storing a processing result such as a guide route, a display controller 43 for generating a map image (a map guide image and an arrow guide image) on the basis of the map information, a VRAM (Video RAM) 44 for storing images generated by the display controller, a menu/list generating unit 45 for generating menu image/various list images, a synthesizing unit 46, a POI search and display controller 47, a buffer memory 48, a wireless receiver 49, and a monitor (display) 50.

A POI search and display controller 47 directly relates to the present invention. The POI search and display controller 47 has a function of searching POIs along the guided route to the destination per distance ranges and arranging the POIs on the monitor 50 as to which POIs should be included in a POI list. The POI search and display controller 47 displays a list of distance ranges and a number of POIs detected in a distance range while showing a mark indicating a user's current position in the distance range. The POI search and display controller 47 arranges an order of listing the POIs based on the distance from the current vehicle position as well as the actual order that the user can see the POIs when traveling on the guided route. The more detailed description about this function and operation will be given below with reference to FIGS. 4–14.

Figure 4:
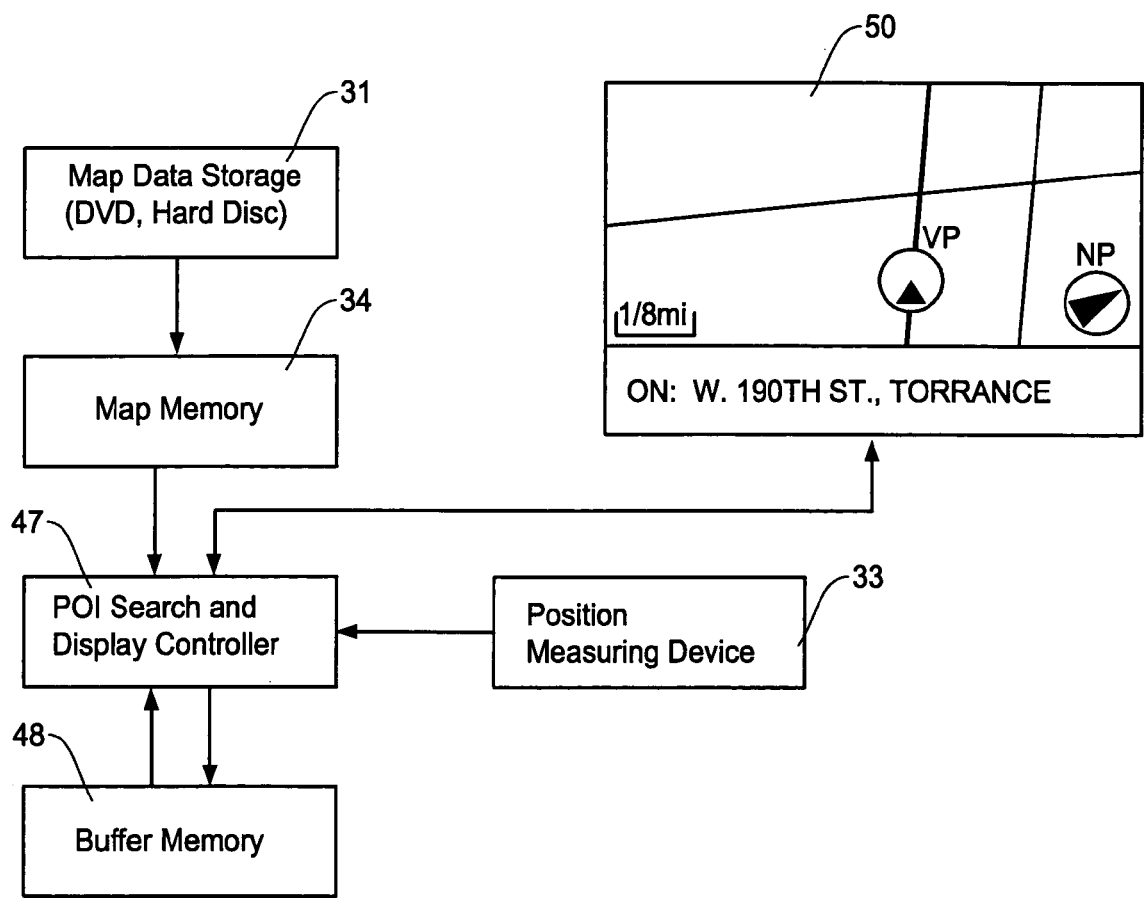
FIG. 4 is a functional block diagram showing a basic structure of the apparatus of the present invention for searching POIs for each distance range along the route to the destination and displaying the POIs in the order that the user actually sees the POIs.

FIG. 4 is a functional block diagram showing an example of basic structure of the apparatus of the present invention for searching POIs along the calculated route to the destination, displaying a list of distance ranges with numbers of POIs, and listing the POI names in the order unique to the present invention. The structure of FIG. 4 is illustrated by the components in the block diagram of FIG. 3 that are directly related to the operation of the present invention. The components of the apparatus of the present invention includes a monitor 50 for interfacing with the user and displaying the search results, and a POI search and display controller 47 for controlling an overall operation of the display method and apparatus of the present invention.

The block diagram of FIG. 4 further includes a map data storage 31 such as a DVD or a hard disc for storing map data, a map memory 34 for storing map data from the map data storage 31, a position measuring device 33 for detecting a current position of the user, and a buffer memory 48 for temporarily storing various types of data for operation and data processing of the apparatus. In an actual application, the POI search and display controller 47 can be implemented by the CPU 39 in FIG. 3 or by a separate controller such as a microprocessor. Further, the buffer memory 48 can be implemented by RAM 41 in FIG. 3 or other memory.

Prior to the POI search along the route, the user specifies a destination, and accordingly, the navigation system produces a calculated route to the destination. Then, the user instructs the navigation system to search POIs along the calculated route to the destination by, for example, selecting a "Find POI along Route" key in FIG. 6B. Typically, the user selects a type of POIs such as, fast food restaurant, gas station, etc., for which the POI search along the route is to be conducted. As shown in FIG. 4, the POI search and display controller 47 retrieves the map data from the map memory 34 and map data storage 31 along the calculated route to the destination.

The POI search and display controller 47 receives information from the position measuring device 33 showing the current vehicle (user) position and defines distance ranges between the current position and the destination. The POI search and display controller 47 also defines a width of the search, i.e., a transversal distance Dt from the route (FIGS. 5A and 9A), such as quarter miles. The POI search and display controller 47 searches POIs along the calculated route from an initial distance range specified by the user by reading the map data from the map memory. The retrieved data is preferably stored in the buffer memory 48.

The POI search and display controller 47 controls the monitor 50 to display a list of distance ranges in which a number of POIs detected is indicated in the corresponding distance range. Preferably, based on the information from the position measuring device 33, the POI search and display controller 47 causes the monitor 50 to display a mark showing the current user (vehicle) position in the corresponding distance range. If the user requests more detailed information on the POIs in a particular distance range, the POI search and display controller 47 causes the monitor 50 to display a list of POI names and other information in the selected distance range.

As noted above, the order of listing the POI names is determined to be an order that the user actually sees the POIs rather than the actual drive lengths. For determining the listing order, the POI search and display controller 47 uses a plurality of region circles having their centers on the route to the destination, retrieves POIs contained in the region circles and quickly calculates a modified distance of each POI by using adjacent centers of the region circles, compares the calculated distances and displays the POIs on the name list in the order of the modified distance. The buffer memory 48 temporarily stores the data necessary for calculating and comparing the distances of POIs.

As noted above, the order of listing the POI names is determined to be an order that the user actually see the POIs rather than the actual drive lengths. For determining the listing order, the POI search and display controller 47 uses a plurality of region circles having their centers on the route to the destination, retrieves POIs contained in the region circles and quickly calculates a modified distance of each POI by using adjacent centers of the region circles, compares the calculated distances and displays the POIs on the name list in the order of the modified distance. The buffer memory 48 temporarily stores the data necessary for calculating and comparing the distances of POIs.

Figure 5A:
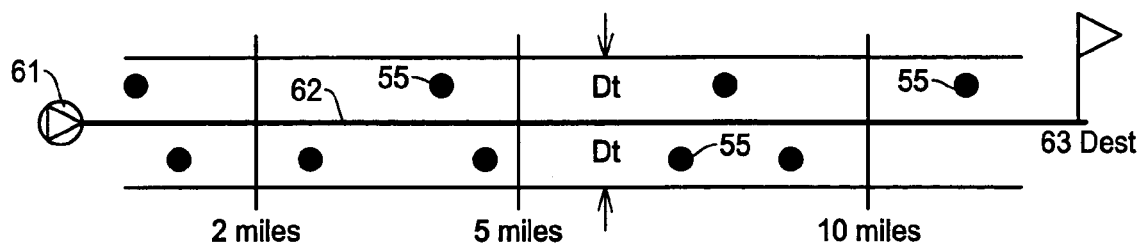
FIGS. 5A–5B are schematic diagrams showing a route to the destination and POIs along the route where POIs are searched per distance ranges and listed on the display in the order determined by the method of the present invention.
Figure 5B:
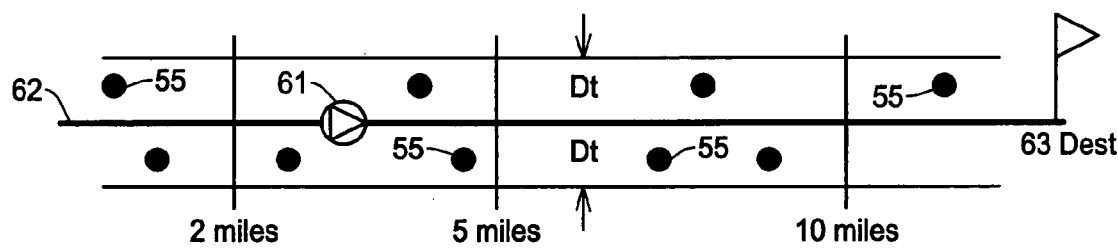

The situation where the display method of the present invention is applicable is schematically shown in FIGS. 5A–5B which illustrate a route to the destination and POIs along the route where POIs are searched per distance range. The POIs detected along the route are listed on the display in the order determined by the method of the present invention. As noted above, the order of listing the POIs along the route is not necessarily in the order of drive length but rather in the order that the user actually sees the POIs when moving along the calculated route.

A reference number 61 indicates a current position of the vehicle (user) travelling through a calculated route 62 to a destination 63, and reference numbers 55 indicate POIs along the calculated route 62. In both FIGS. 5A and 5B, the calculated route 62 to the destination is divided by distance ranges such as 2 miles, 5 miles, and 10 miles. Typically, such distance ranges will be assigned when the navigation system starts the operation for searching POIs along the calculated route in FIG. 5A.

If the distance ranges on the display constantly change upon changes of the current user position, the user will be confused. Thus, the distance ranges assigned in FIG. 5A preferably are unchanged even when the user proceeds on the route 62 as shown in FIG. 5B until specifically requested by the user. The navigation system detects the POIs within a predetermined distance from the calculated route, i.e., a width Dt of two parallel lines outside of the calculated route 62. Typically, the user specifies a category of POIs, such as restaurant or gas station, so that the navigation system detects the POIs in the selected category and sorts the detected POIs by the distance range.

FIGS. 6A–6H show an example of process in the display method of the present invention for specifying the destination, retrieving POIs along the route to the destination for each distance range, and observing detailed information on a selected POI. In this example, it is assumed a situation where a user wants to stop by a way point such as a gas station while traveling to the final destination. The navigation system has already determined a calculated (guided) route to the destination, thus, the user wants to find a preferred gas station on or close to the calculated route.

Figure 6A:
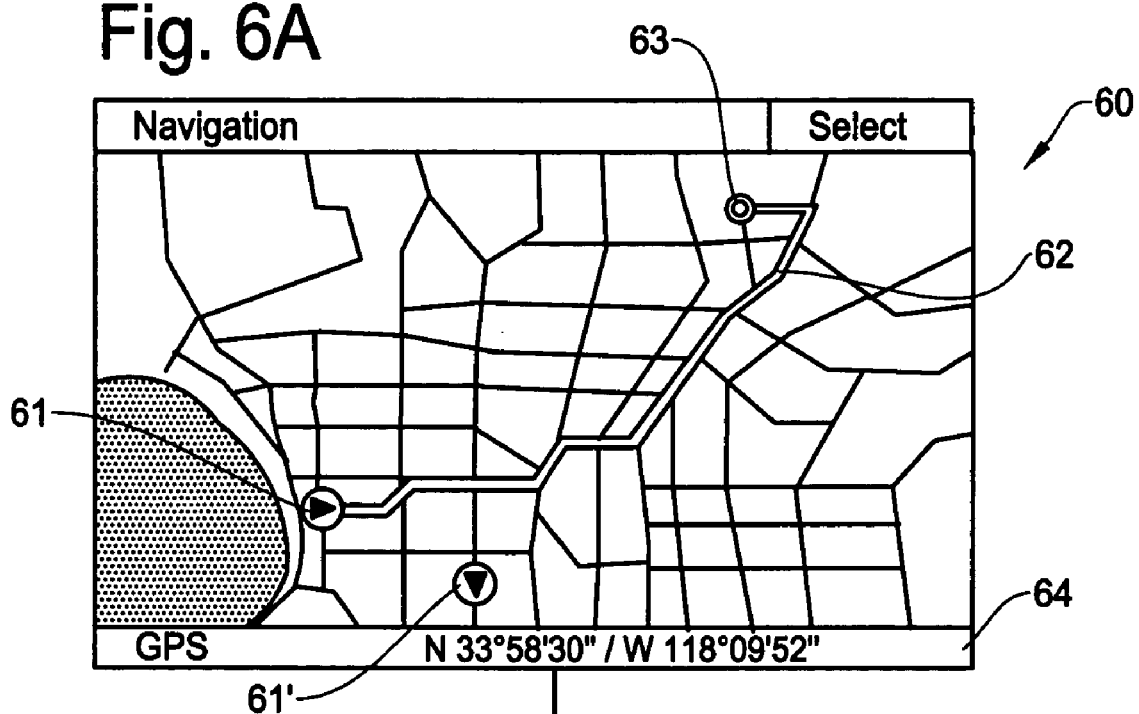
FIGS. 6A–6H are schematic diagrams showing display examples in the navigation system of the present invention, and illustrating steps of searching and listing POIs along the route in such a sequence that a user actually sees the POIs on the calculated road to the destination.

FIG. 6A illustrates a map image 60 on the navigation system showing the calculated (guided) route 62 for guiding the user to the destination 63. In this example, a reference number 61 indicates a user position such as a current vehicle location. A reference number 61' shows a situation where the user is off the route to the destination in which the POI search process along the route in the present invention will not performed. It should be noted that, within the concept of the present invention, the term "user position" is not limited to an actual position of the user but includes any imaginary position on or close to the calculated route 62. Typically, the calculated route 62 to the destination 63 is highlighted on the screen so that it is easily discernible by the user. In this example, text data indicating the current user position is also given in the lower box 64 by latitude and longitude detected by GPS.

Figure 6B:
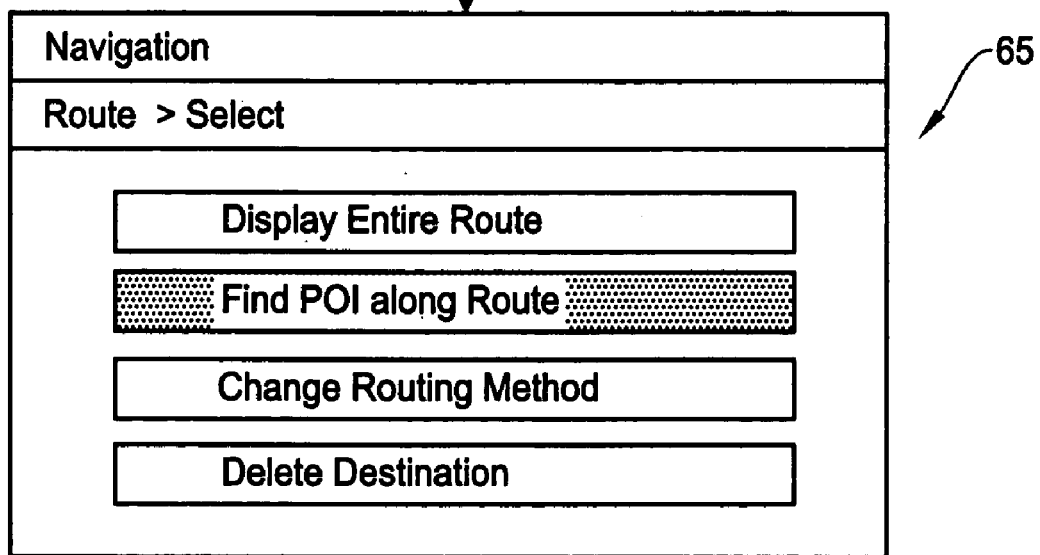

When executing a "Select" menu on the screen of FIG. 6A, the navigation system displays a menu screen 65 as shown in FIG. 6B for selecting the next activity. In this example, the menu includes "Display Entire Route", "Find POI along Route", "Change Routing Method" and "Delete Destination" menus. When the "Display Entire Route" menu is selected, the navigation system displays the entire guided route from the current user position 61 to the destination 63 on the map such as shown in FIG. 6A. When the "Find POI along Route" menu is selected, the process of the present invention starts for finding POIs along the route to the destination within a specified range. When the "Change Routing Method" menu is selected, the user can change the method of selecting the route to the destination such as the shortest way to reach the destination, the route using many free ways as possible or the route without using toll road, and the like. When the "Delete Destination" menu is selected, the user can re-enter a new destination, then, the navigation system calculates a route to the new destination.

Figure 6C:
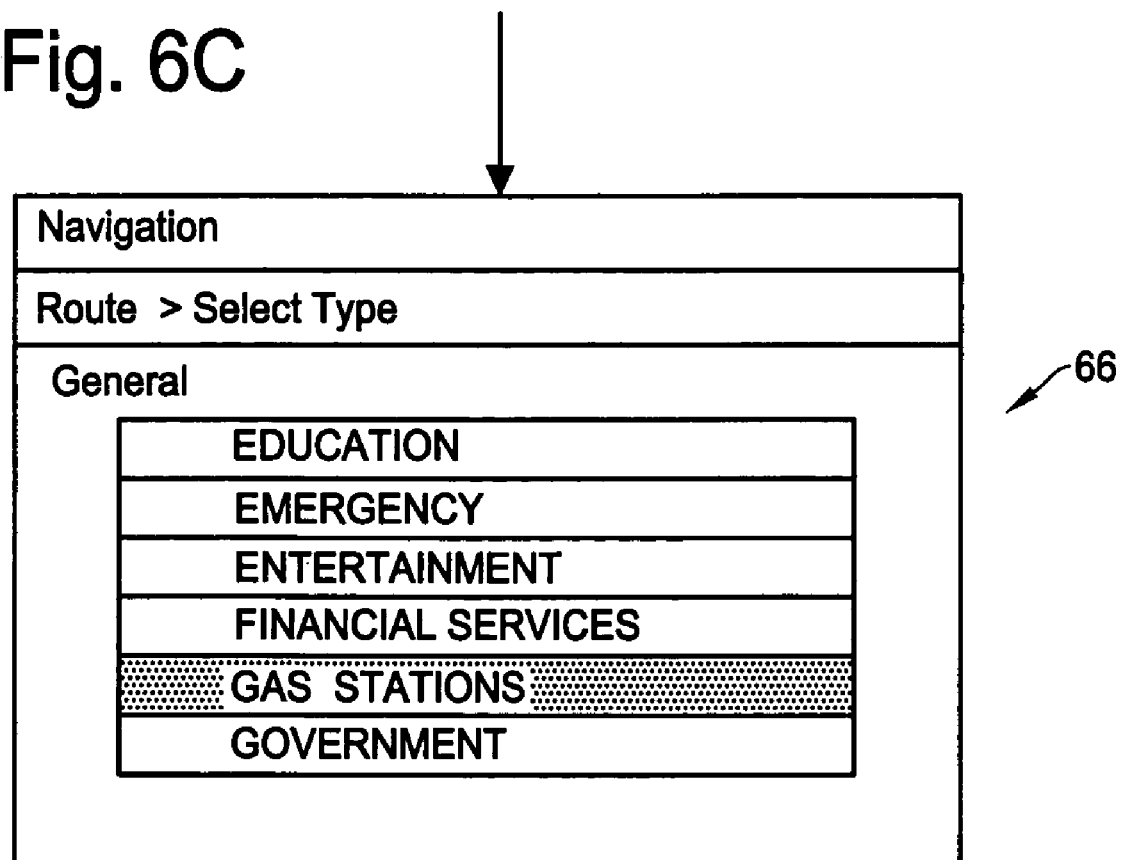

In this case, the user selects the "Find POI along Route" menu because he wants to fill-in the gas at a gas station on or close to the guided route 62 to the destination 63. In response, the navigation system displays a "Select Type" screen 66 as shown in FIG. 6C. The screen 66 shows a list of POI categories such as "Education", "Emergency", "Entertainment", "Financial Services", "Gas Stations", "Government" and so on. Since the user wants to search a gas station in this case, he selects the POI type "Gas Stations" from the list. Then, the navigation system displays a "Select Initial Search Range" screen 67 such as shown in FIG. 6D.

Figure 6D:
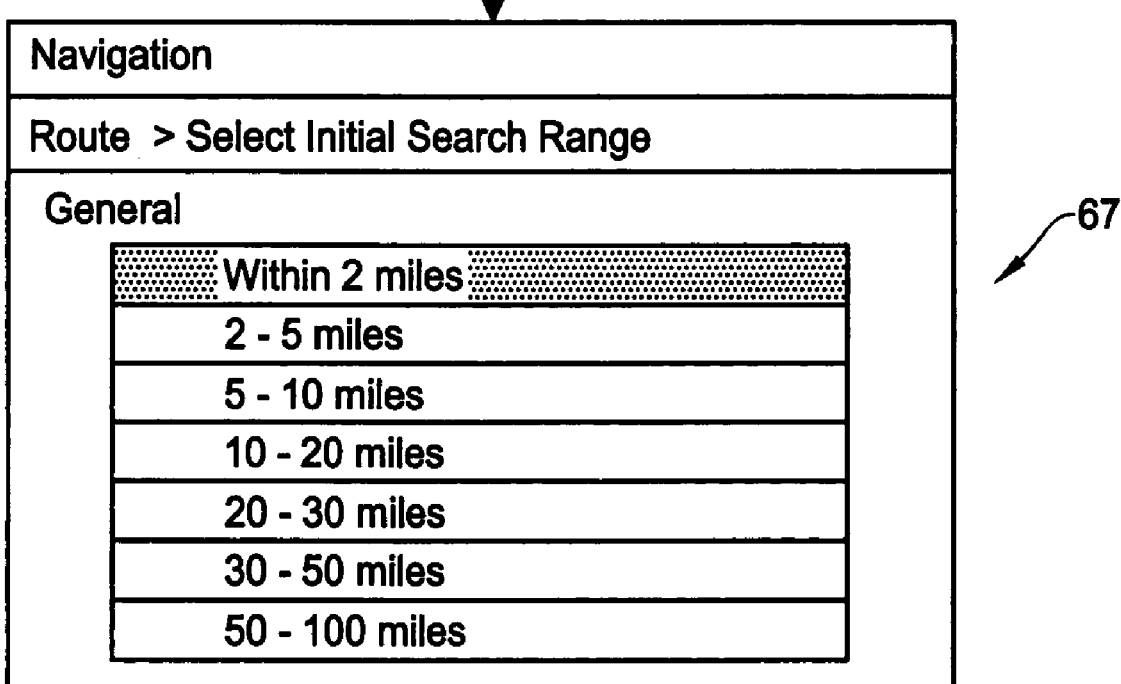

The list on the screen 67 of FIG. 6D typically includes several ranges of distance such as "within 2 miles", "2–5 miles", "5–10 miles", "10–20 miles", "20–30 miles" and the like. This list is used to specify an initial search range for searching POIs by the navigation system. Alternatively, without using the step of selecting the initial search range by the user, the navigation system starts searching the POIs along the route for each distance range immediately after selecting the POI category.

The following example shows a case where the user selects the initial search range. If the user selects "Within 2 miles" as an initial search range, then the navigation system searches POIs of the selected category (gas station) starting from the first distance range where the vehicle is currently located. If the user selects "5–10 miles" as an initial search range, then the navigation system searches for POIs (gas stations) of the selected category starting from 5 miles ahead from the current user (vehicle) position. In other words, the navigation system will not retrieve the POIs in the distance range that is less than 5 miles from the current user position.

Figure 6E:
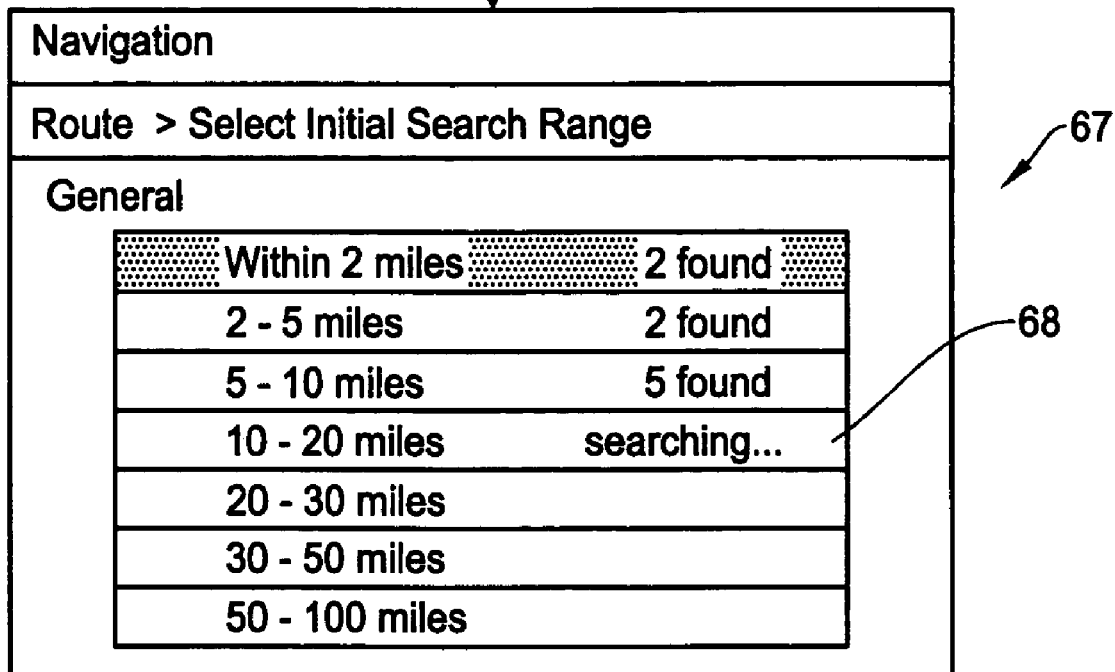
Figure 6F:
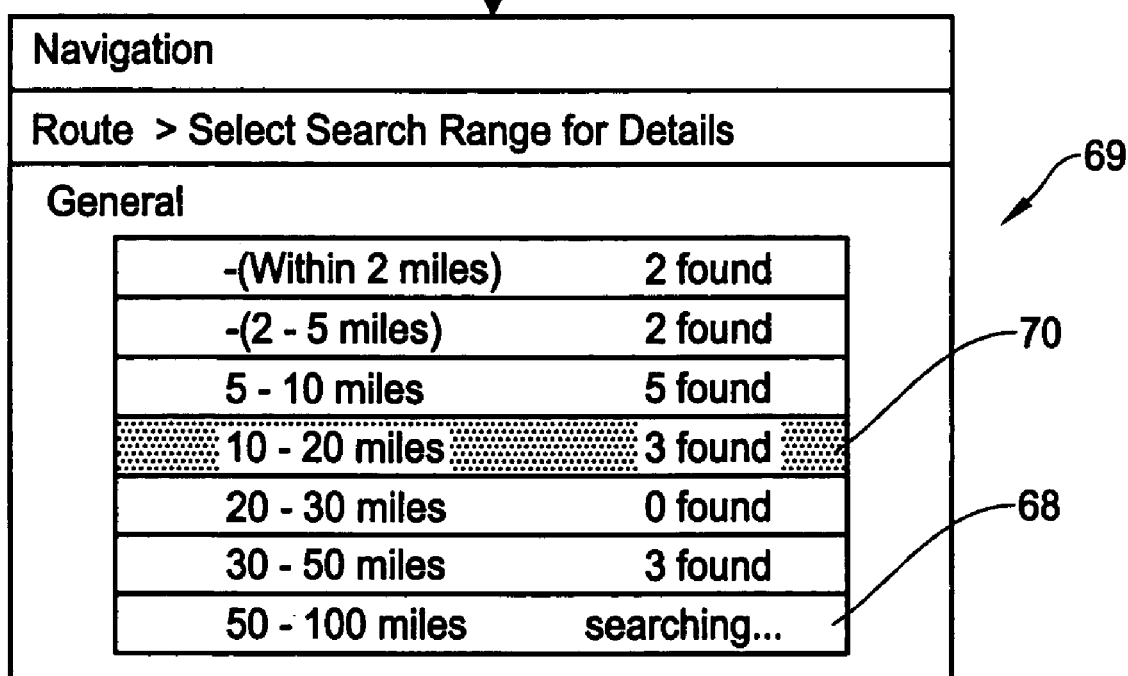

When the user selects "Within 2 miles" in FIG. 6D, the navigation system searches the gas stations for each range along the calculated route 62 in a manner shown in FIG. 6E. This example shows that two gas stations are found within 2 miles, two gas stations are found in the distance range of 2–5 miles, and five gas stations are found in the distance range of 5–10 miles. This example also shows that the navigation system is still searching the gas stations in the distance range of 10–20 miles (shown by numeral 68) and that the search process for the distance ranges 20 miles or greater is not started.

While the vehicle is traveling toward the destination and thus, the current vehicle position is changing, it is possible that the navigation system continuously searches the POIs for the distance ranges. However, if the navigation system constantly searches and calculates the POIs, the resultant POI list frequently changes, which may confuse the user. Thus, it is preferable that the navigation system performs the process of FIGS. 6E–6H only when the user activates (resets, etc.) this process.

If the vehicle is moving while the POI search is being processed, the moved distance is deducted from the searched distance of the POIs, and the navigation system displays the POIs behind the vehicle position as minus distance. Thus, in FIG. 6F, if the user has already moved to a point more than 5 miles from the point where the POI search has started, "Within 2 miles" and "2–5 miles" ranges are denoted by the minus signs. This also indirectly indicates in which distance range the user is currently located. Further, as noted above, if the user is off the route to the destination by more than a predetermined distance as shown by the mark 61' in FIG. 6A, the POI search process is suspended.

Figure 6G:
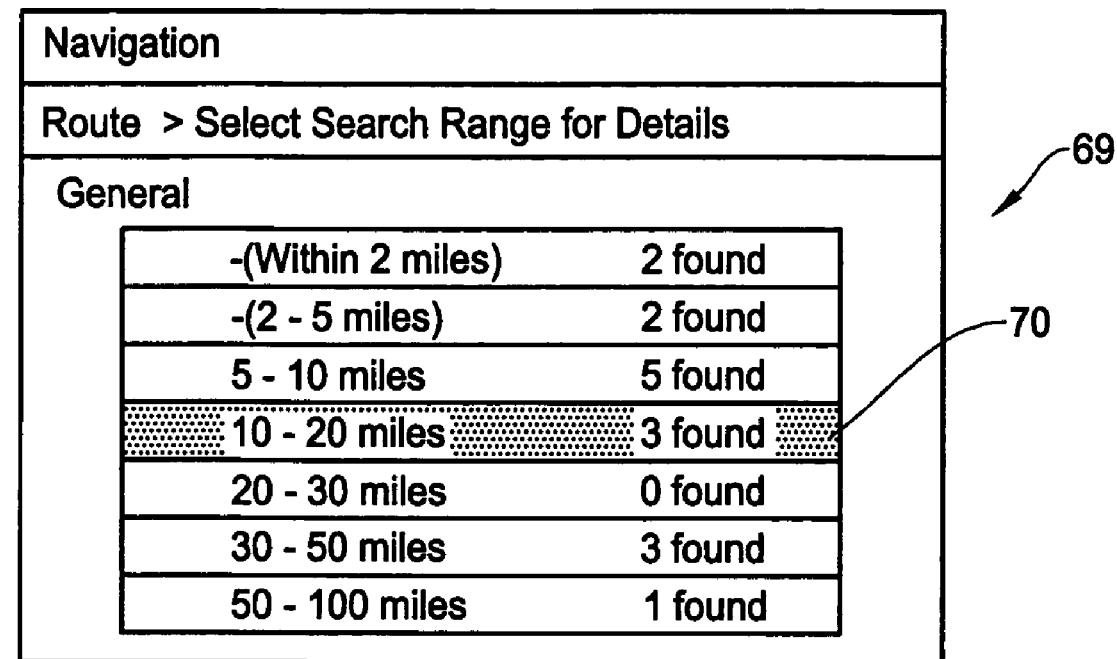
Figure 6H:
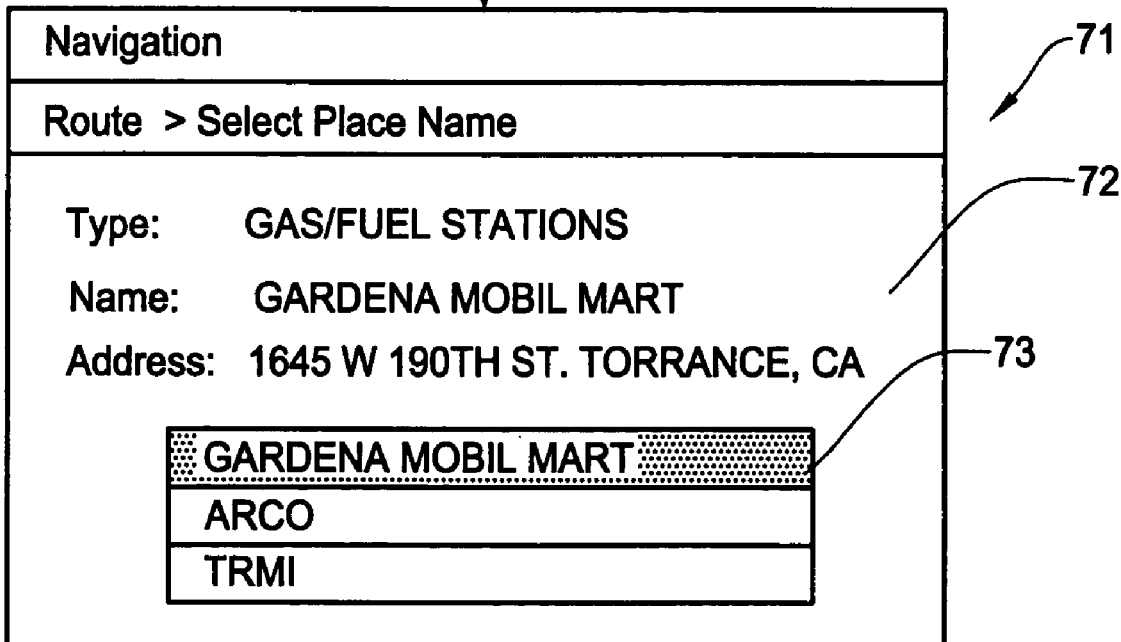

After completing the calculation, the search result is displayed such as shown in a "Select Search Range for Details" screen 69 of FIG. 6G. The list shows the number of POIs (gas stations) in each distance range. In this example, the user selects the distance range "10 to 20 miles" (shown by numeral 70) in FIG. 6G. Then, in FIG. 6H, the navigation system displays a POI name list where three gas stations (POIs) "Gardena Mobil Mart", "Arco" and "TRMI" within the 10–20 mile range from the initial user position are listed. In the present invention, these gas stations are listed in the order such that the user will see them as he drives along the route by the display method of the present invention described later. In other words, this order may not necessary be the same as the order of actual travel distance (drive length) along the roads from the current vehicle position.

Therefore, in traveling along the route, the user will see way points, in this case, gas stations, along the route in the order listed on the POI name list. This feature gives the user a good estimate of seeing the next POI during the travel. If the user wants to be guided to the gas station, he selects a gas station in the POI list in FIG. 6H, and the navigation system displays the "Confirm Route" screen such as shown in FIG. 1F. Then, by further selecting "OK to Proceed", the navigation system calculates the route to the gas station and starts to perform the route guidance such as shown in FIGS. 1G and 1H to the selected gas station.

Figure 7A:
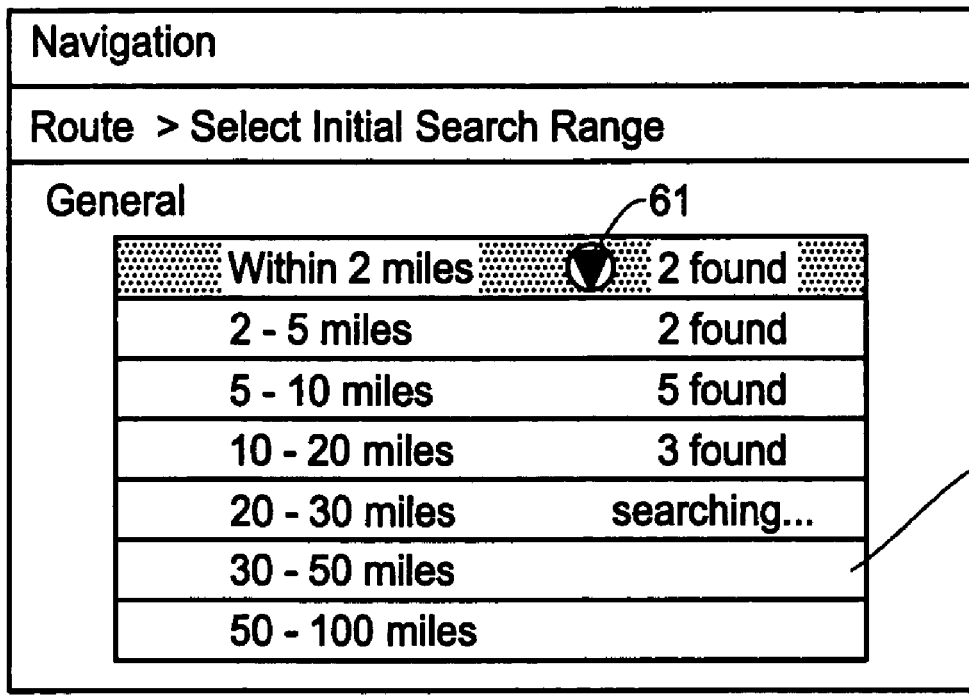
FIGS. 7A–7D are schematic diagrams showing display examples in the navigation system of the present invention for searching POIs along the route and listing the list of distance ranges with numbers of POIs detected in the corresponding distance range while indicating the current user position on the distance range.

FIGS. 7A–7D show the display examples on the navigation system of the present invention where the current vehicle (user) position 61 is marked on the distance range. When the user's vehicle moves to the next distance range, the mark showing the current position 61 will be shifted to the corresponding distance range in the list. In the example of FIG. 7A, the current vehicle position 61 is marked in the distance range of "Within 2 miles". The navigation system is still searching POIs along the route for the distance ranges of 20–30 miles or higher.

Figure 7B:
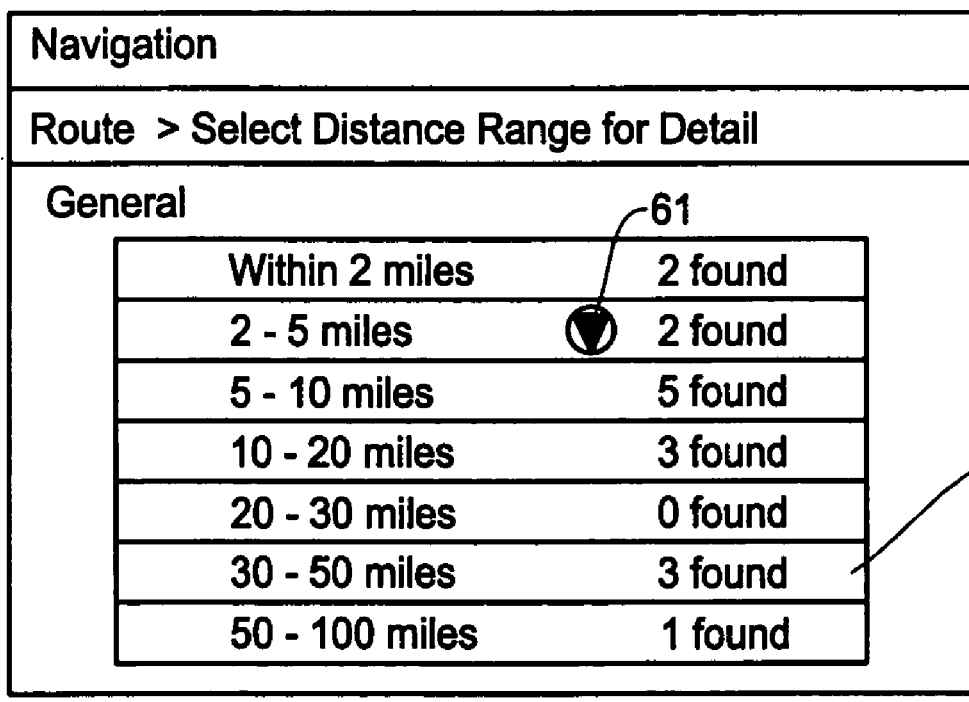

As the user's vehicle proceeds on the route to the destination, the mark moves to the next distance range as shown in FIG. 7B. In the example of FIG. 7B, the POI search process has completed for all the distance ranges, thus the numbers of POIs detected are listed for all of the distance ranges. The user is able to select one of the distance ranges to retrieve more detailed information regarding the POIs in the selected distance range.

Figure 7C:
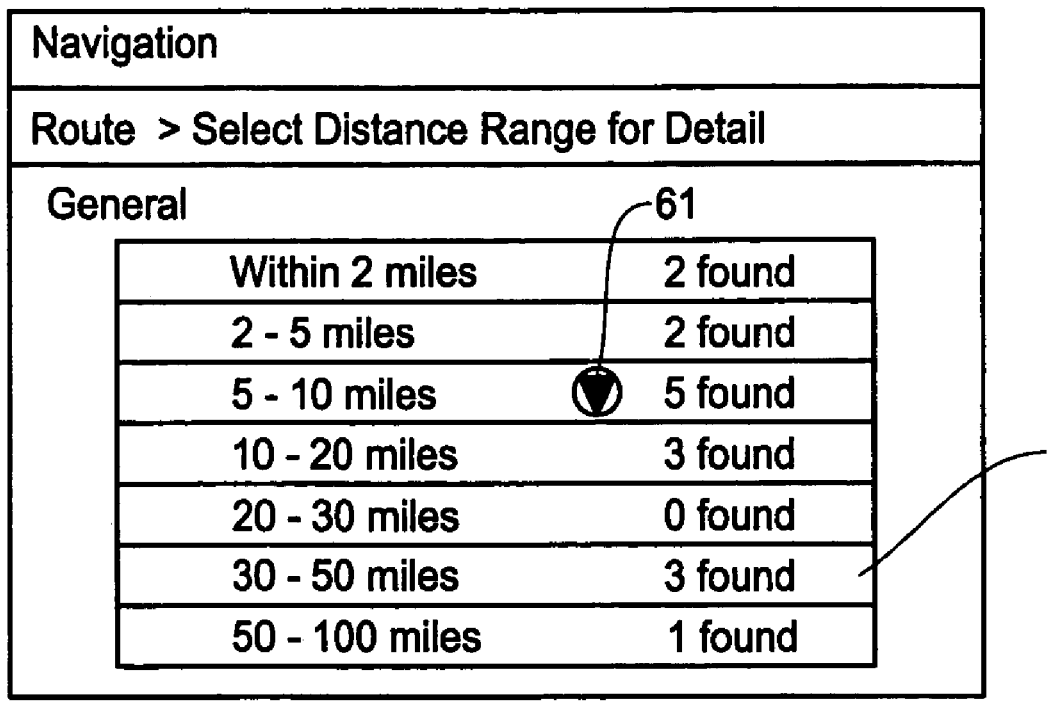
Figure 7D:
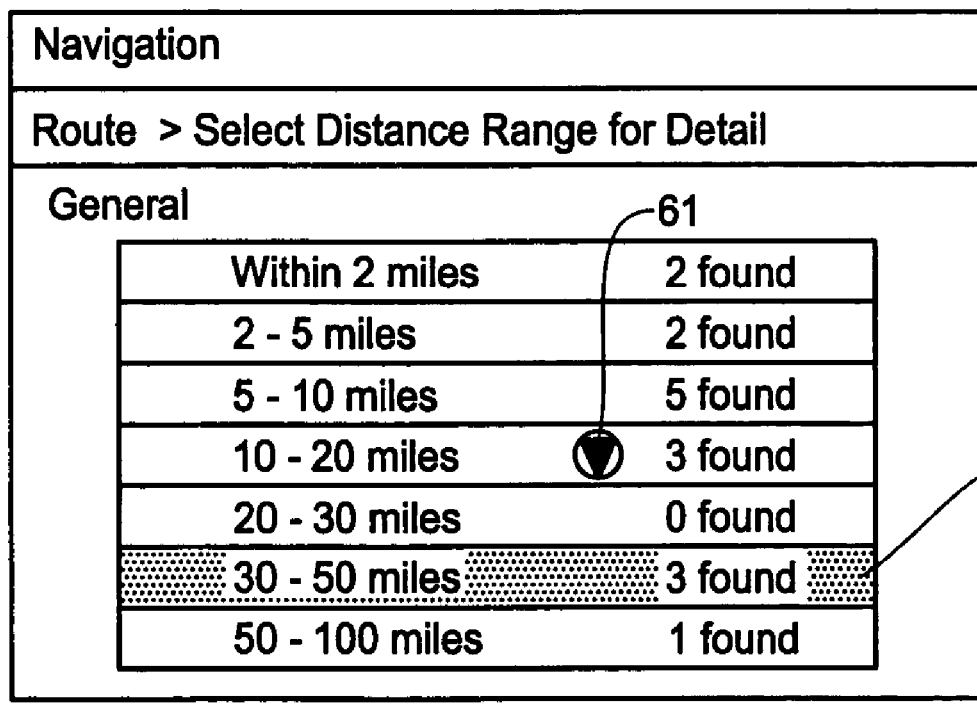

FIG. 7C shows the case where the current vehicle position is now in the 5–10 miles range. In this manner, the list of the distance ranges produced when starting the POI search operation based on the user's position at that time remains unchanged. In response to the changes of the user position, the navigation system illustrates the mark indicating the current user position 61 in the distance range. FIG. 7D shows the case where the current vehicle position is further advanced to the 10–20 miles range. In this example, the user specifies the 30–50 miles range to retrieve the detailed information on the POIs in this range.

Figure 8A:
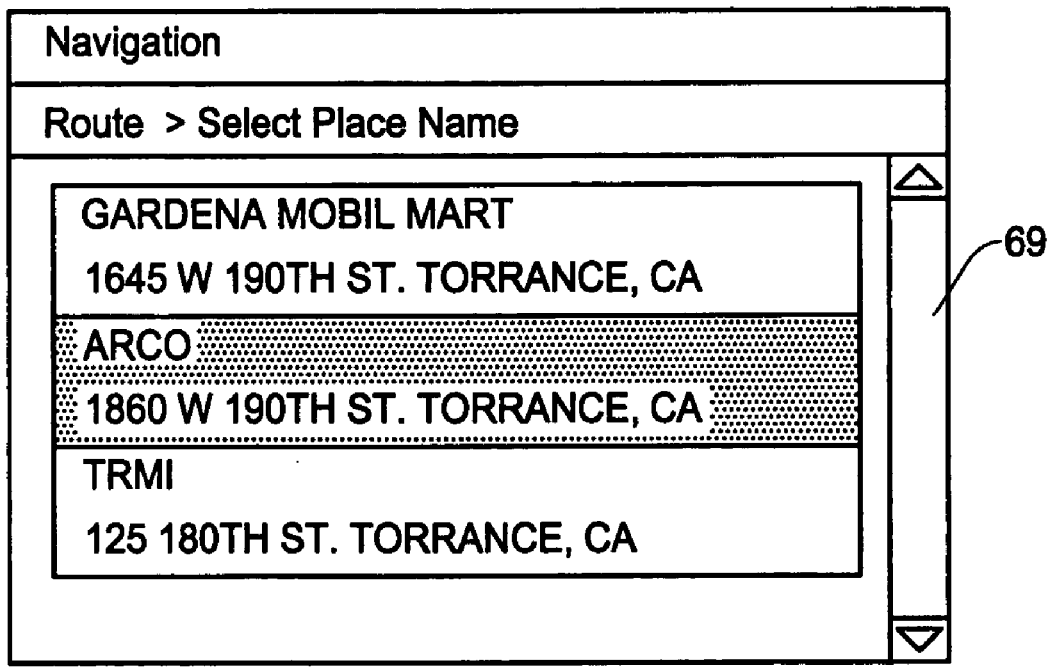
FIGS. 8A–8B are schematic diagrams showing display examples in the navigation system of the present invention for retrieving detailed information of POIs in the selected distance range specified in the process of FIG. 7D.
Figure 8B:
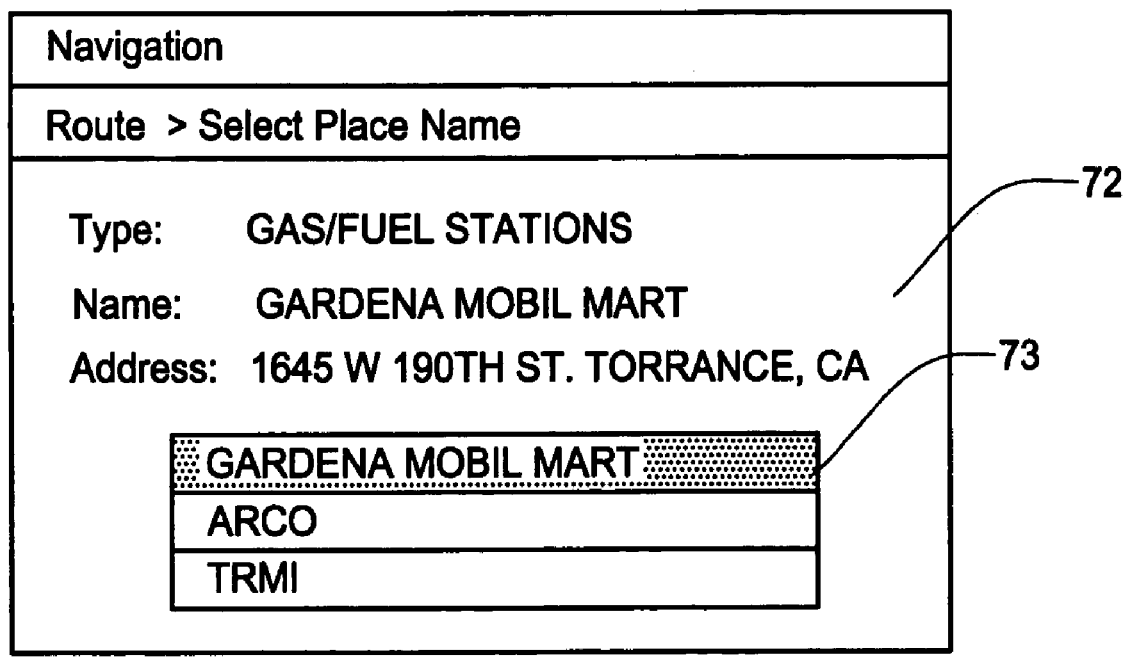

FIGS. 8A and 8B are display examples showing detailed information about POIs within a particular distance range selected in the manner shown in FIG. 7D. In FIG. 8A, POIs in the selected distance range are arranged in the order of distance. As will be described in detail later, in the present invention, the order of distance is modified to the order that the user will actually see in following the guided route. Although only three POIs are shown, more POIs may be listed at the same time. A scroll bar 69 is provided on the screen so that the user can see more POIs.

FIG. 8B is another example of the display showing detailed information on the POIs within the selected distance range. In this case, POI names 73 are listed from which the user can select a particular POI to display its detailed information. The detailed information is shown in an area 73 of the display which includes the address and the type of the POI. As described above, the navigation system of the present invention is capable of informing the current user position with respect to the list of distance ranges where each distance range indicates the POIs along the calculated route to the destination.

As noted above, in the present invention, POIs along the route to the destination are listed in the order such that the user will see them as he drives along the route. This means that the order listed on the navigation screen may not necessary be the same as the order of actual travel distance (drive length) along the roads from the current vehicle position. In the following, a detailed method of arranging an order of listing POIs in the present invention is described with reference to FIGS. 9A–14.

Figure 9A:
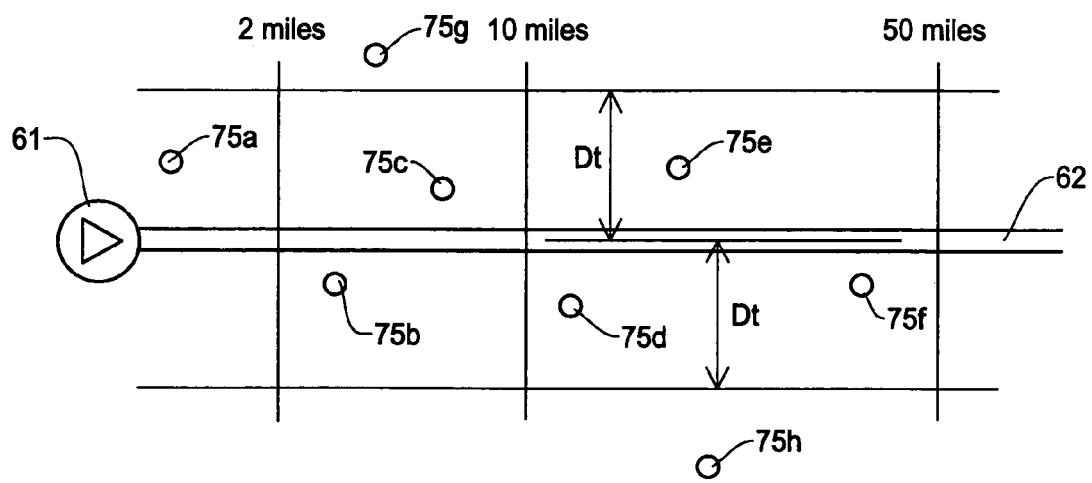
FIG. 9A is a schematic diagram showing ranges of distances for sorting POIs along the calculated route to the destination and FIG. 9B is a schematic diagram showing a concept of circle regions on the calculated route for implementing the method of the present invention.

FIG. 9A shows an example as to how POIs (75a–75f) are distributed along the route and which POIs are retrieved for the purpose of the present invention. The numeral 61 indicates a current user position, typically, a current vehicle location, but it can be any imaginary point on the route 62. The route 62 is divided into several distance ranges, such as 0–2 miles, 2–10 miles and 10–50 miles from the current user position 61. These distance regions correspond to the search ranges in the display example shown in FIGS. 5A–5B and 6E–6G although only three ranges are shown here. In order to arrange an order of listing the POIs on the route to the destination, the navigation system compares distances of all of the POIs (75a–75f) from the current vehicle position 61.

Further, for retrieving only POIs close to the calculated route 62, similar to the example of FIGS. 5A–5B, a distance Dt which is transversal to the calculated route 62 is specified in a manner shown in FIG. 9A. Thus, only POIs within a predefined width along the calculated route 62 are retrieved and measured their distances for determining the listing order. Thus, POIs 75g and 75h in FIG. 9A are not retrieved as entries for POI listing. In other words, a search area is specified by the distance range (ex., 10–50 miles) and the transversal distance Dt. As an example, such a transversal distance Dt is a quarter miles for local streets, and a half mile or more for freeways. Preferably, the distance Dt is preset in the navigation system and can be changed by a user through a set-up process of the navigation system.

Figure 9B:
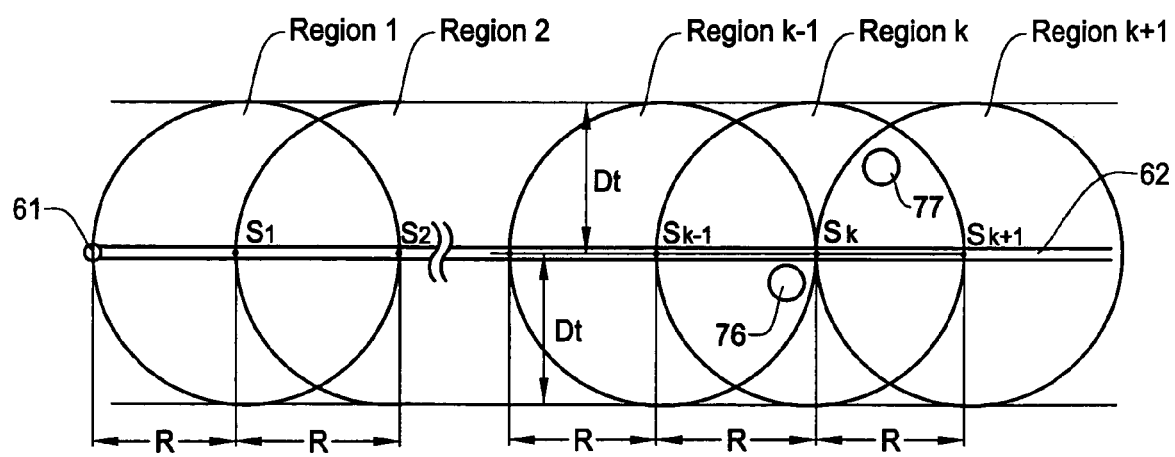

FIG. 9B shows an example of basic concept of the present invention using region circles which divide the route 62 into a plurality of segments each having a constant radius R. By creating the region circles continuously along the route 62, it is clear that the radius R functions as the transversal distance Dt to define the width along calculated route 62. In other words, the radius R corresponds to the transversal distance Dt. Thus, the radius R is typically in the order of 0.2–1 miles. In the example of FIG. 9B, a center Sn (n is an arbitrary natural number) of each region circle is on the calculated route 62. Further, the position of the center Sn of each region circle is at a point where the circumference of the immediately prior region circle intersects with the calculated route 62.

The first region circle (Region 1) is established in the manner of FIG. 9B where the center S1 of the circle is at a position which is away from the current vehicle position 61 by the radius R if the search area includes the current user position. In the case where the distance range is away from the user position such as 2–10 miles in FIG. 9A, the first region circle can be established at the 2 mile point. As shown in FIG. 9B, the center S2 of the next region circuit (Region 2) is a position where the first region circle intersects with calculated route 62.

Namely, the points where the circumference of one region circle intersect with the calculated route are the centers of other region circles such as $S_{k-1}$, $S_k$ and $S_{k+1}$. By defining a plurality of region circles in this manner to cover a predetermined search area specified by the distance range, such as within 2 miles, 2–10 miles, etc. and the radius R of the region circles, the navigation system retrieves the specified type of POIs within the region circles. As noted above, typically, the POIs are retrieved with use of the map data and POI data in the map storage medium 21 such as DVD. Thus, POIs 76 and 77 within the region circles of FIG. 9B will be retrieved by the navigation system.

Figure 10A:
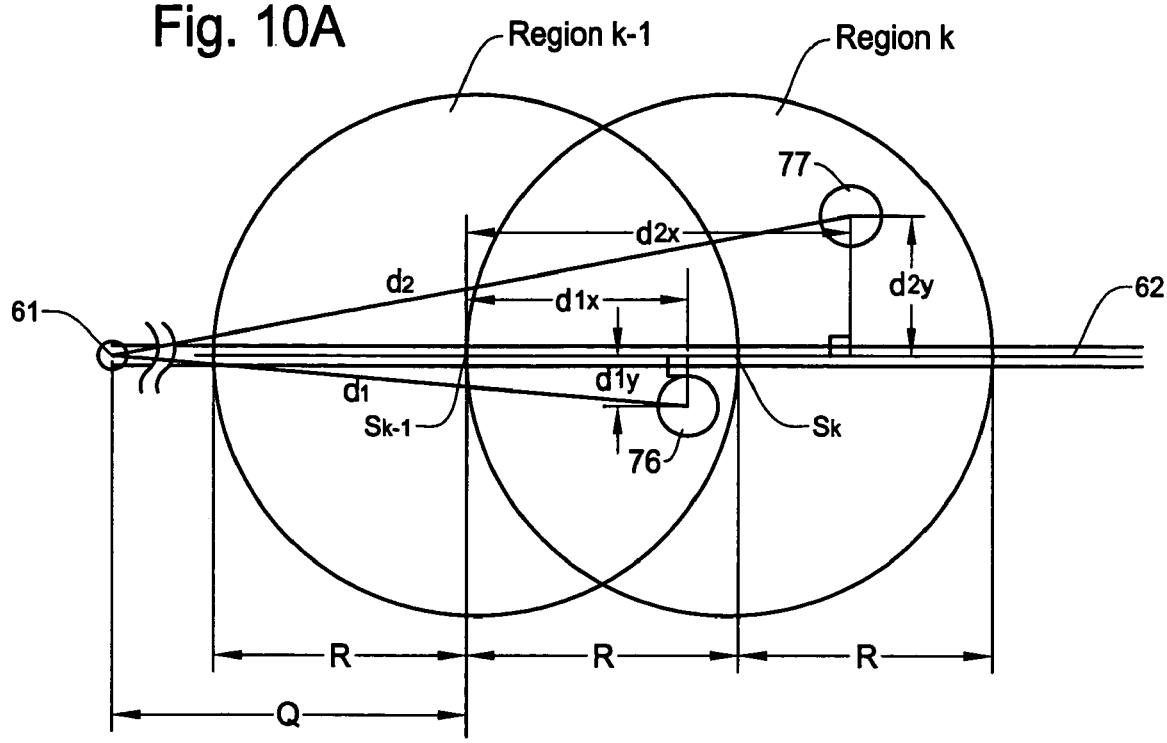
FIG. 10A is a schematic diagram to show a method of calculating a straight-line POI distance by Pythagoras theorem and FIG. 10B is a schematic diagram showing a problem involved in calculating the straight-line distance of POIs when the road is U-turned.

For the purpose of the present invention, the distance between a particular POI and a current vehicle position (user position) can be determined through a Pythagoras theorem in the manner shown in FIG. 10A. Because this method calculates the straight line distance between the user and the POI to determine the order of POI listing, it is expected that the resultant order matches the actual order that the user will see the POIs. In this method, for calculating a length of a hypotenuse of a right triangle, lengths of two sides of the triangle are used.

Thus, in FIG. 10A, the straight-line distance d1 (hypotenuse) between the current position 61 and the POI 76 is calculated by two distances ($Q+D_{1x}$ and $d_{1y}$) which intersect at a right angle with one another. Similarly, the straight-line distance d2 (hypotenuse) between the current position 61 and the POI 77 is calculated by two distances ($Q+D_{2x}$ and $d_{2y}$) which intersect at a right angle with one another. By using the two distances, each straight-line distance is expressed by the following equations:

$$d1^2 = (Q+D_{1x})^2 + d_{1y}^2$$

$$d2^2 = (Q+D_{2x})^2 + d_{2y}^2$$

However, this method is not practical because it takes time to find the values of line segment such as $d_{1y}$ or $d_{2y}$ that is perpendicular to the route. Especially, because the route 62 to the destination is not always a straight line, it is necessary to determine the angle of the route 62 at which the line segments intersect with the route at right angle, which requires a complicated calculation process. Thus, the navigation system has to spend a long time to calculate the distance between the user position and the particular POI.

Figure 10B:
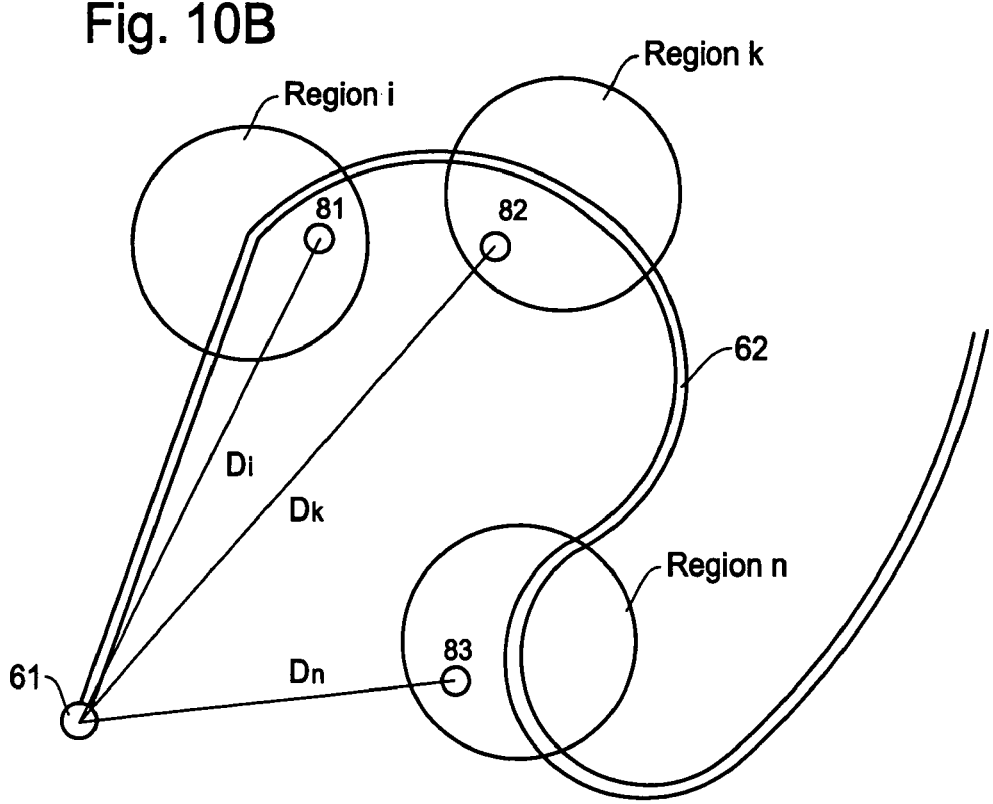

Another problem involved in the method of FIG. 10A is shown in FIG. 10B where the route to the destination is U-turned or zig-zag curved. In the example of FIG. 10B, the straight-line distance between the user position 61 and each POI 81, 82 and 83 can be calculated by the method of FIG. 10A. As a result, the navigation system determines that the straight-line distance to the POI 83 is smaller than that of the POI 81 or POI 82. Even though the user can see the POI 83 closer to him than the other POIs 81 and 82, the drive length to the POI 83 is the longest. Thus, it is not appropriate to display the POI 83 prior to the POIs 81 and 82 in the POI name list. Therefore, although the method using the Pythagoras theorem can be used in the present invention, it is not the best approach.

Figure 11A:
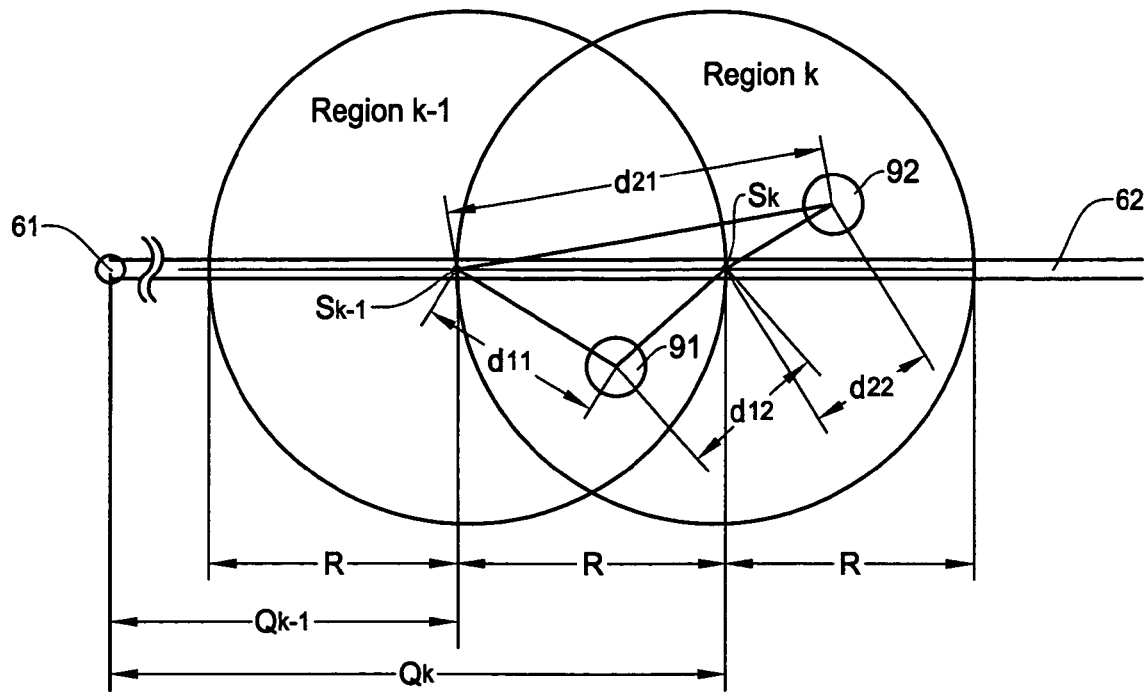
FIGS. 11A–11B are schematic diagrams showing the method of the present invention for calculating the modified POI distance to arrange an order of listing the POIs in the order of distance.
Figure 11B:
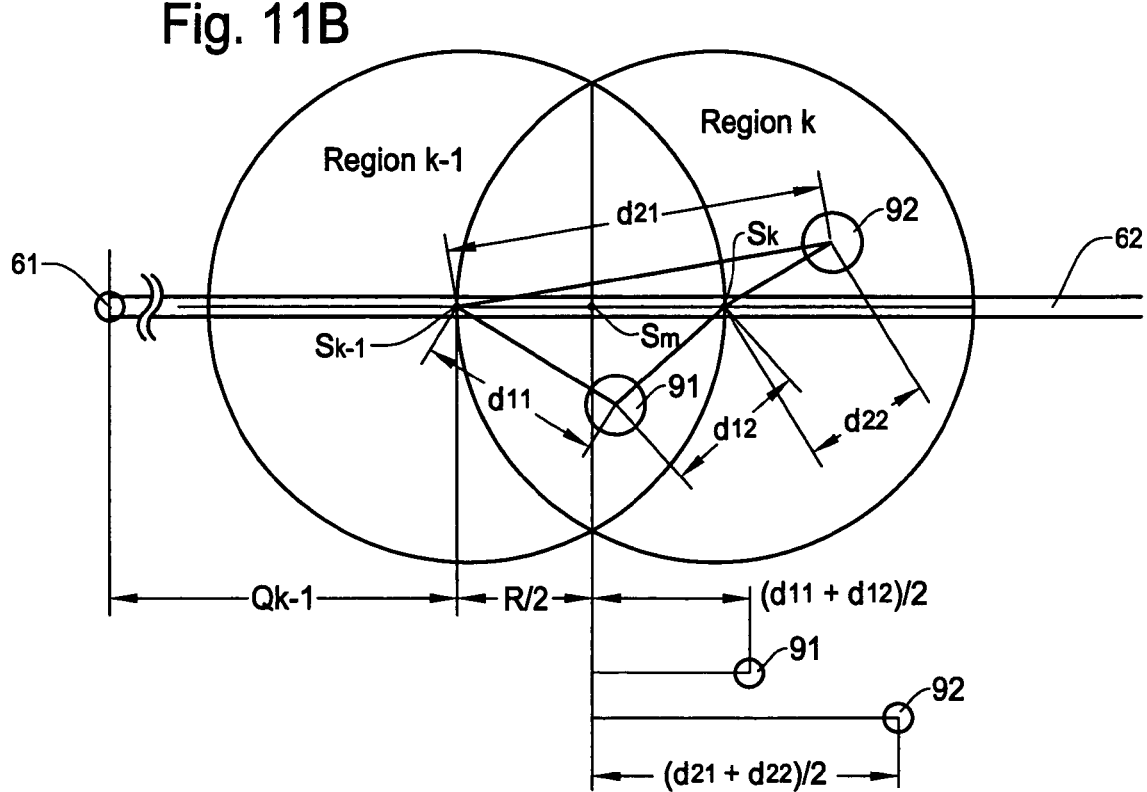

FIGS. 11A–11B show the concept of the preferred embodiment of the present invention. This method utilizes the region circles of FIG. 9B in which both (1) a distance along the calculated route from the user position to a center of particular region circle and (2) a straight-line distance from the center to the particular POI, are used to determine the modified distance to the POI. This approach is able to avoid the problem of FIG. 10B because the distance (drive length) along the route is included as one parameter of the distance calculation. Further, in the method of the present invention, the distances of the POIs can be determined in the order that the user can actually see the POIs.

In the example of FIGS. 11A and 11B, the computation of each POI distance (modified distance) is performed with use of two reference positions which are centers (first center and second center) of the two consecutive region circles. The straight-line distance between the first center and a POI as well as the straight-line distance between the second center and the POI are used to determine the modified POI distance. The drive lengths along the calculated route from the current user position to the first and second centers are also used in the calculation.

More specifically, in FIG. 11A, two consecutive region circles k−1 and k are shown where POIs 91 and 92 are found within an area defined by the two region circles. A first center $S_{k-1}$ is a center of the region circle k−1 and a second center $S_k$ is a center of the region circle k. The distance between the first center $S_{k-1}$ and the POI 91 and the distance between the second center $S_k$ and the POI 91 are denoted by $d_{11}$ and $d_{12}$, respectively. The distance between the first center $S_{k-1}$ and the POI 92 and the distance between the second center $S_k$ and the POI 92 are denoted by $d_{21}$ and $d_{22}$, respectively. In the present invention, the modified distance of each POI is calculated by using the two distances ($d_{11}$ and $d_{12}$, $d_{21}$ and $d_{22}$) from the first and second centers ($S_{k-1}$ and $S_k$) as well as the drive lengths $Q_{k-1}$ and $Q_k$ to the first and second centers ($S_{k-1}$ and $S_k$).

One of the reasons that the distances from the two centers (or generally, two reference points) are considered is to avoid errors in determining the listing order of POIs. For example, in the example of FIG. 11A, if the distance from only the second center $S_k$ is taken into consideration, the navigation system will judge that the POI 92 is closer than the POI 91 because the distance $d_{22}$ is shorter than the distance $d_{12}$. Since it is clear that the user will see the POI 91 first when traveling along the calculated route 62, this judgement is incorrect. In the present invention, however, since the first and second centers $S_{k-1}$ and $S_k$ are used as the reference positions for calculating the modified POI distances, it is possible to avoid this type of error.

As noted above, in calculating the POI distance, the distances between the user position (current vehicle position) 61 and the first and second centers $S_{k-1}$ and $S_k$ are also incorporated. In FIG. 11A, the distance between the user position 61 and the first center $S_{k-1}$ is denoted by $Q_{k-1}$, and the distance between the user position 61 and the second center $S_k$ is denoted by $Q_k$. With use of the above parameters, the modified distance D1 for the POI 91 and the modified distance D2 for the POI 92 are calculated by the following equation:

$$D1 = [(Q_{k-1}+d_{11})+(Q_k+d_{12})]/2 \quad (1)$$

$$D2 = [(Q_{k-1}+d_{21})+(Q_k+d_{22})]/2 \quad (2)$$

As shown in the above equations (1) and (2), the POI distance is obtained by incorporating both the drive length along the road (ex. $Q_{k-1}$, $Q_k$) and the straight-line length (ex. $d_{11}$, $d_{12}$, $d_{21}$ and $d_{22}$). The order of listing the POIs which are sorted by distance well matches the order that the user actually sees the POIs when traveling along the calculated route 62 to the destination. One of the reasons is that, within the particular region circle, the straight-line distance (rather than the drive distance on the road) is used for calculation. Thus, In the example of FIG. 2A, "Hard Rock Cafe" will be listed prior to "Pizza Hut" even though the actual drive length to "Hard Rock Cafe" is longer than that of "Pizza Hut".

In the method of the present invention, even if there arises an inconsistency in the arrangement of POI listing order, such an inconsistency will be negligible for actual application to the navigation system because the visual sense of a user does not require an absolute accuracy. Further, because the drive length along the route is incorporated in the calculation, the problems associated with the U-turn road such as shown in FIGS. 2A and 10B (where actual drive length is significantly different from the straight-line length) will not occur in the method of the present invention. Further, the navigation system is able to perform the calculation easily and quickly because the equations (1) and (2)

noted above are simple and the information on each position of the POIs is given in latitude and longitude by the map data.

FIG. 11B shows the method of the present invention which is basically the same as that of FIG. 11A although the illustration is slightly modified for better understanding. Since $Q_k=Q_{k-1}+R$, the above noted equations (1) and (2) can be modified as follows:

$$D1 = [(Q_{k-1} + d_{11}) + (Q_{k-1} + R + d_{12})]/2 \qquad (3)$$
$$= Q_{k-1} + R/2 + (d_{11} + d_{12})/2$$

$$D2 = [(Q_{k-1} + d_{21}) + (Q_{k-1} + R + d_{22})]/2 \qquad (4)$$
$$= Q_{k-1} + R/2 + (d_{21} + d_{22})/2$$

The above equations (3) and (4) suggest that each distance is calculated by taking an average of two distances, the distance from the first center $S_{k-1}$ and the distance from the second center $S_k$, and adding the average to the distance ($Q_{k-1}$+R/2). In other words, it is equivalent to the situation that an observer stands at the position of $S_m$ (which is $Q_{k-1}$+R/2 from the user position 61) and compares the average values $(d_{11}+d_{12})/2$ for POI 91 and $(d_{21}+d_{22})/2$ for POI 92 as shown in the bottom of FIG. 11B. Thus, in this example, the distance of the POI 91 is shorter than that of the POI 92, thus, the navigation system lists the POI 91 prior to the POI 92.

Figure 12:
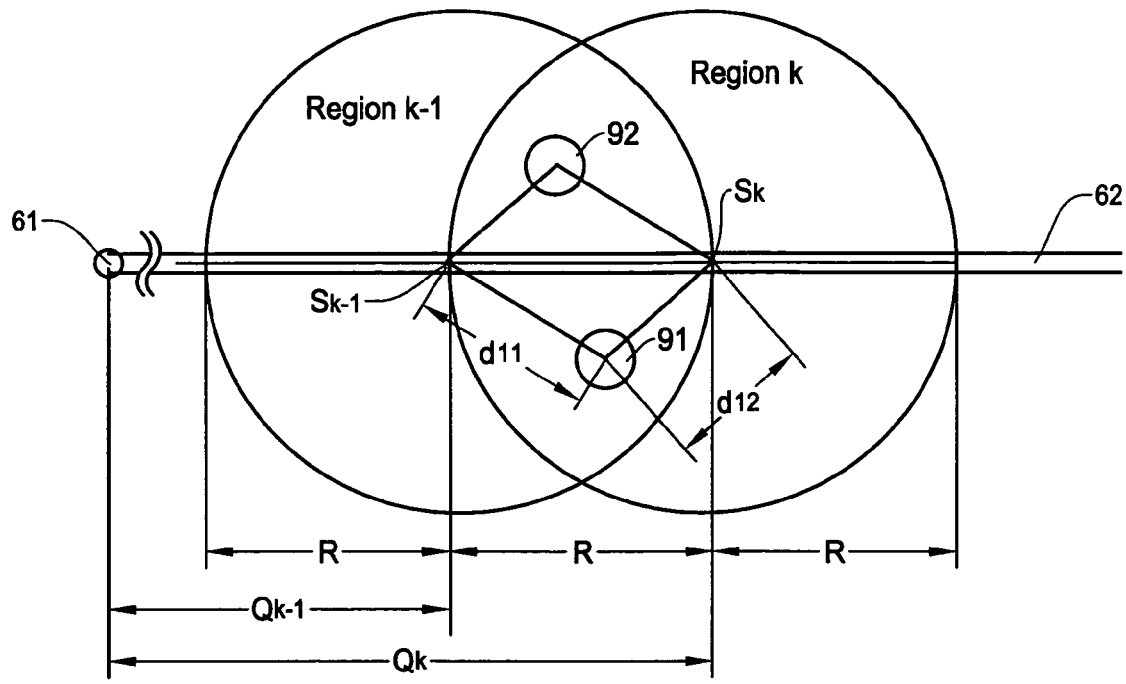
FIG. 12 is a schematic diagram showing a special situation involved in the method of calculating the POI distance in the present invention of FIGS. 11A–11B.

In the above method using the equations (1) and (2) or (3) and (4), it may not be able to distinguish the distances between two POIs when POI 91 and POI 92 are in the positions such as shown in FIG. 12. Namely, in the example of FIG. 12, the POIs 91 and 92 are at the corners of parallelogram, thus, the average of the distances from the first center $S_{k-1}$ and the second center $S_k$ is the same for both the POIs 91 and 92. Accordingly, in the case of FIG. 12, the modified distances D1 and D2 calculated by the above equations become the same although the POI 92 is closer to the user. One of the solutions in such a situation is that the navigation system compares the distances from the first center $S_{k-1}$ and prioritizes the shorter one (POI 92) to the other (POI 91).

In the foregoing, although the present invention is explained for the example where the first and second centers of the first and second region circles are used as reference points. However, these references points are not necessarily be the centers of the region circles but can be any two different points on the route 62. Thus, FIG. 13 shows a more generalized example of the invention for determining the modified distance of the POIs.

Figure 13:
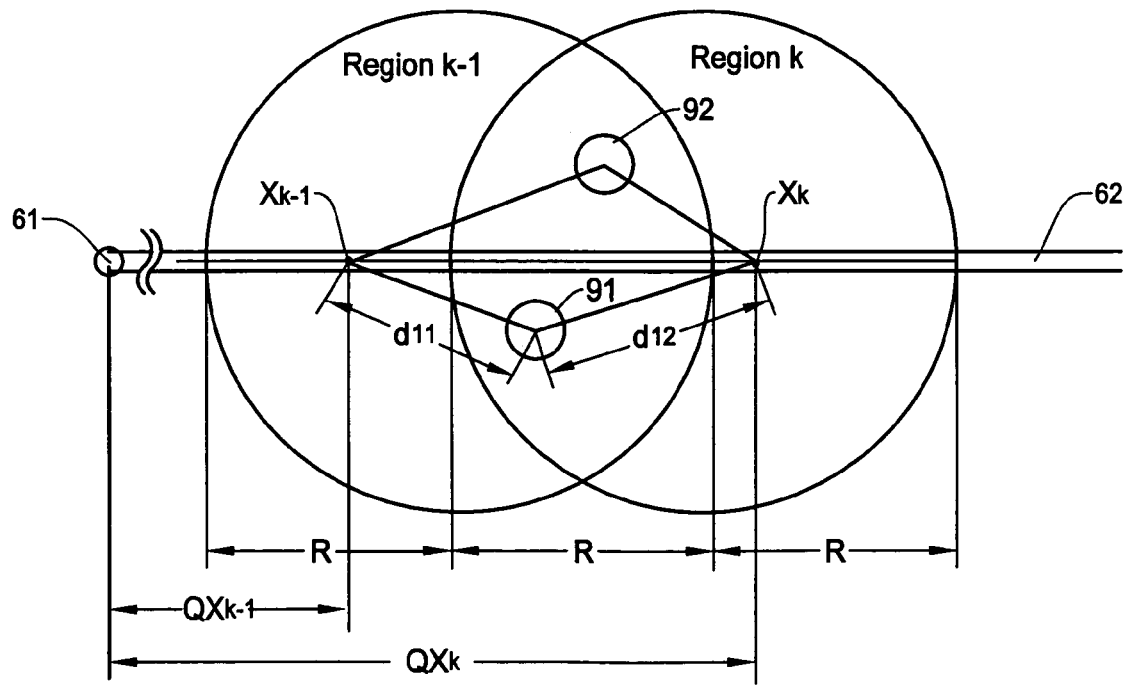
FIG. 13 is a schematic diagram showing a generic illustration for explaining the method of the present invention for calculating the modified POI distance.

In FIG. 13, in calculating the POI distance, a first reference point $X_{k-1}$ and a second reference point $X_k$ are defined on the route 62 to the destination. Further, similar to the above example, distances between the user position (current vehicle position) 61 and the first and second reference points $X_{k-1}$ and $X_k$ are determined. In FIG. 13, the distance between the user position 61 and the first reference $X_{k-1}$ is denoted by $QX_{k-1}$, and the distance between the user position 61 and the second reference point $X_k$ is denoted by $QX_k$. With use of the above parameters, the modified distance D1 for the POI 91 is calculated by the following equation:

$$D1=[(QX_{k-1}+d_{11})+(QX_k+d_{12})]/2 \qquad (5)$$

Figure 14:
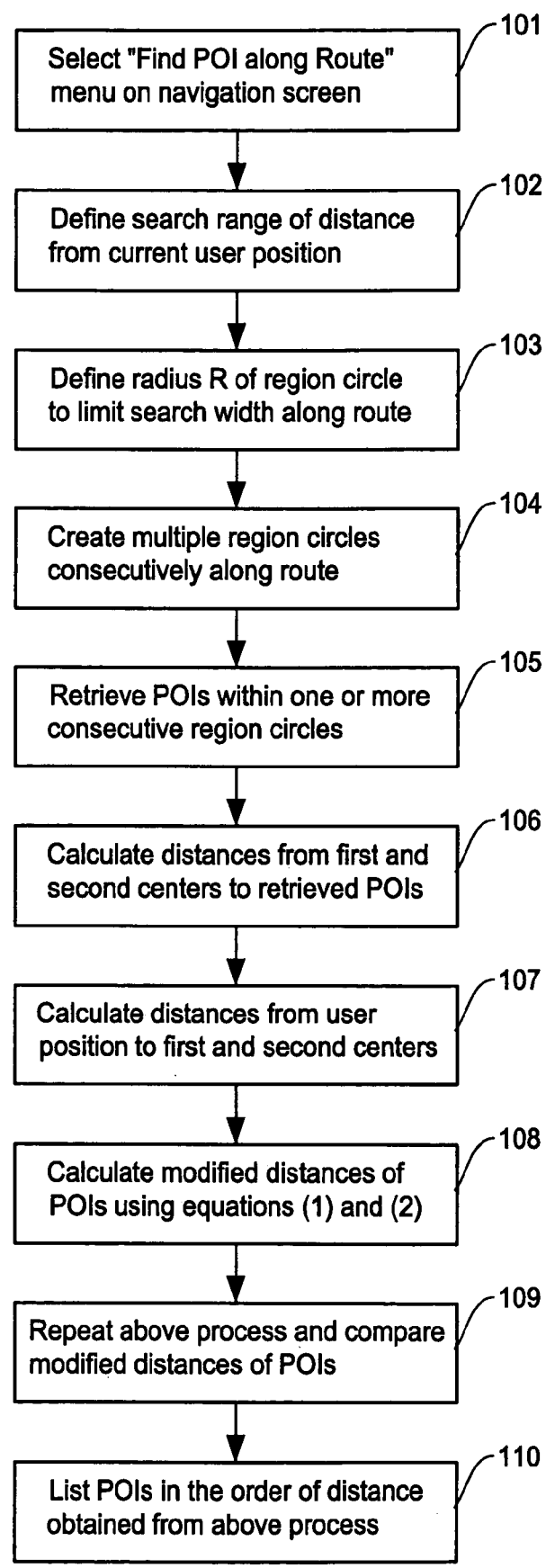
FIG. 14 is a flow chart showing an overall process for arranging an order of displaying POIs by the navigation system of the present invention.

FIG. 14 is a flow chart which summarizes the process of the present invention in order to arrange the listing order of POIs in the sequence that the user can actually see the POIs.

At step 101, the user selects the "Find POI along Route" function of the navigation system on the screen such as shown in FIG. 6B. Then, in step 102, the navigation prompts the user to select search ranges of the distance from the user position.

As noted above with reference to FIGS. 9A and 9B, such a search operation is performed for the specified search area which is defined by the selected distance range along the calculated route with a predetermined width (transversal distance) of the calculated route. To achieve this, at step 103, a radius R of region circle is defined to limit the area in the transversal direction of the calculated route. Actual values of the radius R can be preset in the navigation system or the user can specify the radius R.

At step 104, based on the radius R, a plurality of region circles are created consecutively along the calculated route while defining a plurality of points (centers $S_1$, $S_2$, $S_3$, - - -, $S_{k-1}$, $S_k$, - - - and $S_n$) which equally divide the route within the selected distance range. As noted above with reference to FIG. 9B, the center is defined at a position on the route where the circumference of the prior region circle intersects. The navigation system retrieves the POIs within the search area and calculates the distances of the POIs. In the present invention, POIs within two consecutive region circles are evaluated at step 105 for determining the distances. For example, if the POIs in the first region circle are retrieved, POIs in the overlapped area by the first and second region circles is omitted for the search in the second circle.

In step 106, with respect to the two consecutive region circles, the navigation system calculates a distance ($d_{11}$1) between the first reference point such as the first center $S_{k-1}$ and a particular POI and the distance ($d_{12}$) between the second reference point such as the second center $S_k$ and the POI, respectively. Further, at step 107, the navigation system calculates drive lengths $Q_{k-1}$ and $Q_k$ to the first and second centers $S_{k-1}$ and $S_k$, respectively. Based on the above distances, the navigation system obtains the modified distances to the POIs with use of the equations (1) and (2) in step 108.

The navigation system repeats the above procedures for all the search areas defined in the step 102 and compares the modified distances of the POIs retrieved in the foregoing process. The navigation system displays a POI name list in the order of modified distance obtained in the above process. The order of POIs listed in the POI name list matches the order that the user actually see the POIs rather than the drive lengths to the POIs.

As has been described above, according to the present invention, the navigation system searches POIs along the calculated route to the destination with respect to distance ranges on the calculated route and allows the user to select the distance range to see details of the POIs therein while displaying the current user position in the distance range. The navigation system searches the POIs along the route to the destination and calculates a modified distance of each POI to list the POIs in the order that the user actually sees the POIs as he travels along the guided route to the destination.

For determining the listing order, the method and apparatus of the present invention uses a plurality of region circles having their centers on the route to the destination, retrieves POIs contained in the region circles and quickly calculates a modified distance of each POI by using adjacent centers of the region circles, compares the calculated distances and displays the POIs on the name list in the order of the modified distance. Consequently, the user will view the POI names on the name list in such a sequence that he actually sees the POI along the route to the destination.

Therefore, the user can easily find out preferred POIs in the order listed in the POI list on the monitor screen. Moreover, the navigation system in the present invention can provide the user good estimation and preparation to stop by the favorite POIs along the route.

Although the invention is described herein with reference to the preferred embodiments, one skilled in the art will readily appreciate that various modifications and variations may be made without departing from the spirit and the scope of the present invention. Such modifications and variations are considered to be within the purview and scope of the appended claims and their equivalents.

What is claimed is:

1. A display method for a navigation system for guiding a user to a destination, comprising the following steps of:
   determining a route to the destination;
   specifying a search area along the route to the destination by dividing the route from a user position to the destination into distance ranges and by defining a transversal distance from the route;
   retrieving points of interest (POIs) within the search area;
   displaying a list of distance ranges where each distance range shows a number of POIs retrieved within the distance range; and
   displaying a list of POI names in a distance range selected by a user in an order determined by modified distance of the POIs;
   wherein the modified distance is a combination of a drive length on the route from the user position to a reference point defined on the route and a straight-line length from the reference point to the POI; and
   wherein said step of displaying the list of distance ranges includes a step of illustrating a mark showing a current position of a user in a user corresponding distance range.

2. A display method as defined in claim 1, wherein said step of defining the search area includes a step of defining a radius of a region circle and creating a plurality of region circles consecutively on the route, and said step of listing the POI names includes a step of calculating the modified distance of each POI based on distances from two (first and second) reference points on the route in two consecutive region circles to the POI and distances from the user position to the two reference points.

3. A display method as defined in claim 2, further comprising a step of repeating the steps of retrieving POIs within the search area and calculating the modified distance of each POI to determine the order of listing the POIs.

4. A display method as defined in claim 2, wherein said step of calculating the modified distance of each POI is conducted by:

$$D1=[(Q_{k-1}+d_{11})+(Q_k+d_{12})]/2$$

where D1 is a modified distance of a particular POI, $d_{11}$ is a distance between the first reference point and the POI, $d_{12}$ is a distance between the second reference point and the POI, $Q_{k-1}$ is a distance between the user position and the first reference point, and $Q_k$ is a distance between the user position and the second reference point.

5. A display method as defined in claim 4, wherein said first reference point is a center of one of the two consecutive region circles and the second reference point is a center of another region circle.

6. A display method as defined in claim 5, wherein said step of calculating the modified distance of each POI includes a step of prioritizing a POI whose distance $d_{11}$ from the first center is shorter than that of the other POIs for determining the order of listing the POIs when modified distances of two or more POIs in the consecutive two region circles are identical to one another.

7. A display method as defined in claim 5, wherein said step of creating the plurality of region circles includes a step of defining a center of a region circle at a position on the route at which a circumference of an immediately prior region circle intersects.

8. A display method as defined in claim 2, wherein said radius of said region circle is smaller when said route to the destination is a local street than that when the route is a freeway.

9. A display method as defined in claim 8, wherein said radius of said region circle defines the transversal distance of said search area, thereby limiting a distance in a transversal direction of the route.

10. A display method as defined in claim 2, wherein said step of specifying the search area includes a step of selecting an initial search range out of a plurality of distance ranges.

11. A display method as defined in claim 1, wherein said step of displaying the distance range includes a step of selecting a distance range to display detailed information on the POIs in the selected distance range.

12. A display method as defined in claim 1, wherein said step of retrieving POIs includes a step of suspending the retrieval of POIs when the user position is away from the route to the destination by more than a predetermined distance.

13. A display method as defined in claim 1, wherein said step of displaying the number of POIs in each distance range includes a step of displaying the distance range of the POIs with a minus sign when the user position has passed a point in the distance range along the route.

14. A display method as defined in claim 1, wherein said step of retrieving POIs includes a step of displaying a list of categories to select one of the categories of POIs to be retrieved within the search area.

15. A display apparatus for a navigation system for guiding a user to a destination, comprising:
   means for determining a route to the destination;
   means for specifying a search area along the route to the destination by dividing the route from a user position to the destination into distance ranges and by defining a transversal distance from the route;
   means for retrieving points of interest (POIs) within the search area;
   means for displaying a list of distance ranges where each distance range shows a number of POIs retrieved within the distance range; and
   means for displaying a list of POI names in a distance range selected by a user in an order determined by modified distance of the POIs;
   wherein the modified distance is a combination of a drive length on the route from the user position to a reference point defined on the route and a straight-line length from the reference point to the POI; and
   wherein said means for displaying the list of distance ranges includes means for illustrating a mark showing a current position of a user in a corresponding distance range.

16. A display apparatus as defined in claim 15, wherein said means for defining the search area includes means for defining a radius of a region circle and creating a plurality of region circles consecutively on the route, and said means for listing the POI names includes means for calculating the modified distance of each POI based on distances from two (first and second) reference points on the route in two consecutive region circles to the POI and distances from the user position to the two reference points.

17. A display apparatus as defined in claim 16, further comprising means for repeating the processes of retrieving POIs within the search area and calculating the modified distance of each POI to determine the order of listing the POIs.

18. A display apparatus as defined in claim 16, wherein said means for calculating the modified distance of each POI conducts calculation by:

$$D1=[(Q_{k-1}+d_{11})+(Q_k+d_{12})]/2$$

where D1 is a modified distance of a particular POI, $d_{11}$ is a distance between the first reference point and the POI, $d_{12}$ is a distance between the second reference point and the POI, $Q_{k-1}$ is a distance between the user position and the first reference point, and $Q_k$ is a distance between the user position and the second reference point.

19. A display apparatus as defined in claim 18, wherein said first reference point is a center of one of the two consecutive region circles and the second reference point is a center of another region circle.

20. A display apparatus as defined in claim 19, wherein said means for calculating the modified distance of each POI includes means for prioritizing a POI whose distance $d_{11}$ from the first center is shorter than that of the other POIs for determining the order of listing the POIs when modified distances of two or more POIs in the consecutive two region circles are identical to one another.

21. A display apparatus as defined in claim 19, wherein said means for creating the plurality of region circles includes means for defining a center of a region circle at a position on the route at which a circumference of an immediately prior region circle intersects.

22. A display apparatus as defined in claim 16 wherein said radius of said region circle is smaller when said route to the destination is a local street than that when the route is a freeway.

23. A display apparatus as defined in claim 22, wherein said radius of said region circle defines a width of said search area, thereby limiting a distance in a transversal direction of the route.

24. A display apparatus as defined in claim 16, wherein said means for specifying the search area includes means for selecting an initial search range out of a plurality of distance ranges.

25. A display apparatus as defined in claim 15, wherein said means for displaying the distance range includes means for selecting a distance range to display detailed information on the POIs in the selected distance range.

26. A display apparatus as defined in claim 25, wherein said means for retrieving POIs includes means for suspending the retrieval of POIs when the user position is away from the route to the destination by more than a predetermined distance.

27. A display apparatus as defined in claim 15, wherein said means for displaying the number of POIs in each distance range includes means for displaying the distance range of the POIs with a minus sign when the user position has passed a point in the distance range along the route.

28. A display apparatus as defined in claim 15, wherein said means for retrieving POIs includes means for displaying a list of categories to select one of the categories of POIs to be retrieved within the search area.

* * * * *